US009185461B2

(12) United States Patent
Ozawa et al.

(10) Patent No.: US 9,185,461 B2
(45) Date of Patent: Nov. 10, 2015

(54) SPOT NOTIFICATION METHOD, SPOT NOTIFICATION DEVICE, AND SPOT NOTIFICATION DEVICE PROGRAM

(71) Applicant: Panasonic Intellectual Property Corporation of America, Torrance, CA (US)

(72) Inventors: Yuka Ozawa, Osaka (JP); Yoshihiro Ujiie, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/400,924

(22) PCT Filed: Mar. 4, 2014

(86) PCT No.: PCT/JP2014/001199
§ 371 (c)(1),
(2) Date: Nov. 13, 2014

(87) PCT Pub. No.: WO2014/141626
PCT Pub. Date: Sep. 18, 2014

(65) Prior Publication Data
US 2015/0143391 A1 May 21, 2015

Related U.S. Application Data

(60) Provisional application No. 61/779,884, filed on Mar. 13, 2013.

(51) Int. Cl.
*H04N 7/173* (2011.01)
*H04N 21/4722* (2011.01)
(Continued)

(52) U.S. Cl.
CPC ............ *H04N 21/4722* (2013.01); *G01C 21/00* (2013.01); *G06F 17/30* (2013.01);
(Continued)

(58) Field of Classification Search
CPC .............. H04N 21/41; H04N 21/4104; H04N 21/4126; H04N 21/41407; H04N 21/478
See application file for complete search history.

(56) References Cited

U.S. PATENT DOCUMENTS

| 2002/0184200 A1 | 12/2002 | Ueda et al. |
| 2006/0105780 A1 | 5/2006 | Ueda et al. |

(Continued)

FOREIGN PATENT DOCUMENTS

| JP | 2009-129002 | 6/2009 |
| JP | 2010-243186 | 10/2010 |

(Continued)

OTHER PUBLICATIONS

International Search Report issued Jun. 3, 2014 in International (PCT) Application No. PCT/JP2014/001199.

*Primary Examiner* — John Schnurr
(74) *Attorney, Agent, or Firm* — Wenderoth, Lind & Ponack, L.L.P.

(57) ABSTRACT

A spot notification device includes: a viewing history acquisition unit that acquires a program viewing history of a user; a program metadata acquisition unit that acquires program metadata including a name and locational information on a spot introduced in a program; a spot list generation unit that generates, on the basis of the viewing history and the program metadata, a spot list including the name and locational information on the spot; a current location acquisition unit that acquires a current location of the user; an activity history holding unit that holds the current location in time series as an activity history; a notifying spot determination unit that sets a search range in accordance with the activity history and refers to the spot list to search for the spot present within the search range; and a spot notification unit that notifies the user of information relating to the spot.

9 Claims, 27 Drawing Sheets

(51) Int. Cl.

| | | |
|---|---|---|
| *G01C 21/00* | (2006.01) | |
| *G06F 17/30* | (2006.01) | |
| *H04H 60/31* | (2008.01) | |
| *H04H 60/54* | (2008.01) | |
| *H04H 60/70* | (2008.01) | |
| *H04M 11/00* | (2006.01) | |
| *H04N 21/435* | (2011.01) | |
| *H04N 21/442* | (2011.01) | |
| *H04N 21/45* | (2011.01) | |
| *H04W 4/02* | (2009.01) | |
| *H04L 29/08* | (2006.01) | |

(52) U.S. Cl.
CPC ...... *G06F17/3087* (2013.01); *G06F 17/30241* (2013.01); *H04H 60/31* (2013.01); *H04H 60/54* (2013.01); *H04H 60/70* (2013.01); *H04L 67/18* (2013.01); *H04L 67/22* (2013.01); *H04M 11/00* (2013.01); *H04N 21/435* (2013.01); *H04N 21/44222* (2013.01); *H04N 21/4524* (2013.01); *H04W 4/025* (2013.01)

(56) References Cited

U.S. PATENT DOCUMENTS

| | | |
|---|---|---|
| 2006/0105781 A1 | 5/2006 | Ueda et al. |
| 2011/0295971 A1 | 12/2011 | Takagi |
| 2013/0173633 A1 * | 7/2013 | Piepgrass et al. ............ 707/748 |

FOREIGN PATENT DOCUMENTS

| | | |
|---|---|---|
| JP | 2011-248496 | 12/2011 |
| WO | 02/31441 | 4/2002 |

\* cited by examiner

FIG. 4

| | PROGRAM TITLE | BROADCAST DATE/TIME | SPOT NAME | SPOT LOCATION | SPOT URL |
|---|---|---|---|---|---|
| 32 { | GOURMET VISIT TO TRADITIONAL AREA | 2013/03/09 08:00~10:00 | YYY CAFE | (xx1,yy1) | http:// xx1··· |
| | | | ZZZ RESTAURANT | (xx2,yy2) | http:// xx2··· |
| | | | XXX BOUTIQUE | (xx3,yy3) | http:// xx3··· |
| 33 { | VISITS TO JAPANESE HOT SPRINGS | 2013/03/09 10:00~12:00 | CCC FALLS | (xx4,yy4) | http:// xx4··· |
| | | | AAA CHURCH | (xx5,yy5) | http:// xx5··· |
| | | | BBB HOT SPRING | (xx6,yy6) | http:// xx6··· |
| | DAYTIME NEWS | 2013/03/09 12:00~14:00 | DDD ZOO | (xx7,yy7) | http:// xx7··· |
| | | | EEE PARK | (xx8,yy8) | http:// xx8··· |
| | HOT SPRING MURDER CASE FILE | 2013/03/09 14:00~16:00 | FFF HOT SPRING | (xx9,yy9) | http:// xx9··· |
| | ⋮ | ⋮ | ⋮ | ⋮ | ⋮ |

| PROGRAM TITLE | BROADCAST DATE/TIME |
|---|---|
| GOURMET VISIT TO TRADITIONAL AREA | 2013/03/09 08:00~10:00 |
| VISITS TO JAPANESE HOT SPRINGS | 2013/03/09 10:00~12:00 |

| PROGRAM TITLE | BROADCAST DATE /TIME | SPOT NAME | SPOT LOCATION | SPOT URL |
|---|---|---|---|---|
| MORNING NEWS | 2013/03/08 06:00~07:00 | TOKYO STATION | (xx0,yy0) | http:// xx0··· |

| PROGRAM TITLE | BROADCAST DATE /TIME | SPOT NAME | SPOT LOCATION | SPOT URL |
|---|---|---|---|---|
| MORNING NEWS | 2013/03/08 06:00~07:00 | TOKYO STATION | (xx0,yy0) | http:// xx0··· |
| GOURMET VISIT TO TRADITIONAL AREA | 2013/03/09 08:00~10:00 | YYY CAFE | (xx1,yy1) | http:// xx1··· |
| GOURMET VISIT TO TRADITIONAL AREA | 2013/03/09 08:00~10:00 | ZZZ RESTAURANT | (xx2,yy2) | http:// xx2··· |
| GOURMET VISIT TO TRADITIONAL AREA | 2013/03/09 08:00~10:00 | XXX BOUTIQUE | (xx3,yy3) | http:// xx3··· |
| VISITS TO JAPANESE HOT SPRINGS | 2013/03/09 10:00~12:00 | CCC FALLS | (xx4,yy4) | http:// xx4··· |
| VISITS TO JAPANESE HOT SPRINGS | 2013/03/09 10:00~12:00 | AAA CHURCH | (xx5,yy5) | http:// xx5··· |
| VISITS TO JAPANESE HOT SPRINGS | 2013/03/09 10:00~12:00 | FFF HOT SPRING | (xx6,yy6) | http:// xx6··· |

53 { (row 1)
54 { (rows 2-4)
55 { (rows 5-7)

FIG. 7A

| DATE/TIME | USER LOCATIONAL INFORMATION |
|---|---|
| ⋮ | ⋮ |
| 2013/03/09 14:00 | (aa1,bb1) |
| 2013/03/09 14:05 | (aa2,bb2) |
| 2013/03/09 14:10 | (aa3,bb3) |
| 2013/03/09 14:15 | (aa4,bb4) |
| 2013/03/09 14:20 | (aa5,bb5) |

FIG. 7B

| DATE/TIME | USER LOCATIONAL INFORMATION |
|---|---|
| ⋮ | ⋮ |
| 2013/03/09 14:20 | (aa5,bb5) |
| 2013/03/09 14:20 | (aa5,bb5) |
| ⋮ | ⋮ |
| 2013/03/10 12:00 | (cc1,dd1) |
| 2013/03/10 12:05 | (cc2,dd2) |
| 2013/03/10 12:10 | (cc3,dd3) |
| 2013/03/10 12:15 | (cc4,dd4) |
| 2013/03/10 12:20 | (cc5,dd5) |

| PROGRAM TITLE | BROADCAST DATE/TIME | SPOT NAME | SPOT LOCATION | SPOT URL | OPENING HOURS | OPTIMUM VISITING TIME | SPOT TYPE |
|---|---|---|---|---|---|---|---|
| GOURMET VISIT TO TRADITIONAL AREA | 2013/ 03/09 08:00~ 10:00 | YYY CAFE | (xx1, yy1) | http:// xx1··· | 10:00~ 19:00 | 14:00~ 16:00 | CAFE |
| | | ZZZ RESTAURANT | (xx2, yy2) | http:// xx2··· | 10:00~ 21:00 | 11:00~ 13:00 | DINING |
| | | XXX BOUTIQUE | (xx3, yy3) | http:// xx3··· | 10:00~ 19:00 | 14:00~ 16:00 | SHOPPING |
| VISITS TO JAPANESE HOT SPRINGS | 2013/ 03/09 10:00~ 12:00 | CCC FALLS | (xx4, yy4) | http:// xx4··· | ALL DAY | 10:00~ 17:00 | SCENIC SPOT |
| | | AAA CHURCH | (xx5, yy5) | http:// xx5··· | ALL DAY | 17:00~ 20:00 | SPOT GAINING PEOPLE'S ATTENTION |
| | | BBB HOT SPRING | (xx6, yy6) | http:// xx6··· | 10:00~ 19:00 | 10:00~ 19:00 | HOT SPRING |
| DAYTIME NEWS | 2013/ 03/09 12:00~ 14:00 | DDD ZOO | (xx7, yy7) | http:// xx7··· | 10:00~ 17:00 | 12:00~ 15:00 | ZOO |
| | | EEE PARK | (xx8, yy8) | http:// xx8··· | 10:00~ 17:00 | 12:00~ 15:00 | PARK |
| HOT SPRING MURDER CASE FILE | 2013/ 03/09 14:00~ 16:00 | FFF HOT SPRING | (xx9, yy9) | http:// xx9··· | 10:00~ 19:00 | 10:00~ 19:00 | HOT SPRING |
| ⋮ | ⋮ | ⋮ | ⋮ | ⋮ | ⋮ | ⋮ | ⋮ |

| PROGRAM TITLE | BROADCAST DATE/TIME | SPOT NAME | SPOT LOCATION | SPOT URL | OPENING HOURS | OPTIMUM VISITING TIME | SPOT TYPE |
|---|---|---|---|---|---|---|---|
| GOURMET VISIT TO TRADITIONAL AREA | 2013/03/09 08:00~10:00 | YYY CAFE | (xx1, yy1) | http://xx1··· | 10:00~19:00 | 14:00~16:00 | CAFE |
| GOURMET VISIT TO TRADITIONAL AREA | 2013/03/09 08:00~10:00 | ZZZ RESTAURANT | (xx2, yy2) | http://xx2··· | 10:00~21:00 | 11:00~13:00 | DINING |
| GOURMET VISIT TO TRADITIONAL AREA | 2013/03/09 08:00~10:00 | XXX BOUTIQUE | (xx3, yy3) | http://xx3··· | 10:00~19:00 | 14:00~16:00 | SHOPPING |
| VISITS TO JAPANESE HOT SPRINGS | 2013/03/09 10:00~12:00 | CCC FALLS | (xx4, yy4) | http://xx4··· | ALL DAY | 10:00~17:00 | SCENIC SPOT |
| VISITS TO JAPANESE HOT SPRINGS | 2013/03/09 10:00~12:00 | AAA CHURCH | (xx5, yy5) | http://xx5··· | ALL DAY | 17:00~20:00 | SPOT GAINING PEOPLE'S ATTENTION |
| VISITS TO JAPANESE HOT SPRINGS | 2013/03/09 10:00~12:00 | BBB HOT SPRING | (xx6, yy6) | http://xx6··· | 10:00~19:00 | 10:00~19:00 | HOT SPRING |

FIG. 18

| SPOT TYPE | SPOT SEARCH RANGE | | |
|---|---|---|---|
| | SHORT DISTANCE | MIDDLE DISTANCE | LONG DISTANCE |
| CAFE | 300m | 500m | 1km |
| DINING | 500m | 1km | 3km |
| SHOPPING | 300m | 500m | 1km |
| SCENIC SPOT | 100m | 5km | 10km |
| SPOT GAINING PEOPLE'S ATTENTION | 300m | 500m | 1km |
| HOT SPRING | 500m | 1km | 3km |
| ⋮ | ⋮ | ⋮ | ⋮ |

| SPOT TYPE | NOTIFICATION CONDITIONS 1801 | | | | NOTIFICATION TIMING | NOTIFICATION METHOD |
|---|---|---|---|---|---|---|
| | CURRENT TIME | MOVING SPEED | 1-HOUR MOVEMENT RANGE | PRESENCE/ ABSENCE OF STAY OF 30 MINUTES OR MORE | | |
| CAFE | WITHIN OPENING HOURS | NOT MORE THAN 5 km/h | NOT MORE THAN 3 km | ABSENT | IMMEDIATELY | LIGHT EMISSION (GREEN) + VIBRATION + VOICE/SOUND |
| | WITHIN OPENING HOURS | NOT MORE THAN 5 km/h | — | — | IMMEDIATELY | LIGHT EMISSION (GREEN) |
| DINING | DURING OPTIMUM VISING TIME | NOT MORE THAN 5 km/h | — | ABSENT | IMMEDIATELY | LIGHT EMISSION (GREEN) + VIBRATION + VOICE/SOUND |
| SHOPPING | DURING OPTIMUM VISING TIME | NOT MORE THAN 5 km/h | NOT MORE THAN 3 km | — | IMMEDIATELY | LIGHT EMISSION (GREEN) + VIBRATION + VOICE/SOUND |
| | WITHIN OPENING HOURS | NOT MORE THAN 5 km/h | NOT MORE THAN 5 km | — | NOT MORE THAN ACTIVITY LEVEL x | LIGHT EMISSION (GREEN) |
| SCENIC SPOT | DURING OPTIMUM VISING TIME | NOT MORE THAN 50 km/h | — | — | IMMEDIATELY | LIGHT EMISSION (RED) + VIBRATION + VOICE/SOUND |
| | 06:00~ 20:00 | NOT MORE THAN 30 km/h | — | — | NOT MORE THAN ACTIVITY LEVEL x | LIGHT EMISSION (GREEN) |
| SPOT GAINING PEOPLE'S ATTENTION | WITHIN OPENING HOURS | NOT MORE THAN 5 km/h | — | — | IMMEDIATELY | LIGHT EMISSION (PINK) + VIBRATION |
| HOT SPRING | WITHIN OPENING HOURS | NOT MORE THAN 30 km/h | — | — | IMMEDIATELY | LIGHT EMISSION (GREEN) + VIBRATION |

FIG. 23

| PROGRAM TITLE | BROADCAST DATE/TIME | SPOT NAME | SPOT BROADCAST TIME | SPOT LOCATION | SPOT URL |
|---|---|---|---|---|---|
| GOURMET VISIT TO TRADITIONAL AREA | 2013/03/09 08:00~10:00 | YYY CAFE | 08:10~ 08:15 | (xx1, yy1) | http:// xx1··· |
| | | ZZZ RESTAURANT | 08:15~ 08:20 | (xx2, yy2) | http:// xx2··· |
| | | XXX BOUTIQUE | 08:20~ 08:25 | (xx3, yy3) | http:// xx3··· |
| VISITS TO JAPANESE HOT SPRINGS | 2013/03/09 10:00~12:00 | CCC FALLS | 10:10~ 10:15 | (xx4, yy4) | http:// xx4··· |
| | | AAA CHURCH | 10:15~ 10:20 | (xx5, yy5) | http:// xx5··· |
| | | BBB HOT SPRING | 10:20~ 10:25 | (xx6, yy6) | http:// xx6··· |
| DAYTIME NEWS | 2013/03/09 12:00~14:00 | DDD ZOO | 12:00~ 12:10 | (xx7, yy7) | http:// xx7··· |
| | | EEE PARK | 12:10~ 12:20 | (xx8, yy8) | http:// xx8··· |
| HOT SPRING MURDER CASE FILE | 2013/03/09 14:00~16:00 | FFF HOT SPRING | 14:30~ 14:35 | (xx9, yy9) | http:// xx9··· |
| ⋮ | ⋮ | ⋮ | ⋮ | ⋮ | ⋮ |

| PROGRAM TITLE | BROADCAST DATE/TIME | VIEWING SITUATION | |
|---|---|---|---|
| GOURMET VISIT TO TRADITIONAL AREA | 2013/03/09 08:00~10:00 | 08:00~08:15 | NORMALLY REPRODUCED |
| | | 08:15~08:20 | REPRODUCED AT DOUBLE SPEED |
| | | 08:20~10:00 | UNVIEWED |
| VISITS TO JAPANESE HOT SPRINGS | 2013/03/09 10:00~12:00 | 10:00~10:15 | NORMALLY REPRODUCED |
| | | 10:15~10:20 | REPRODUCED MULTIPLE TIMES |
| | | 10:20~12:00 | UNVIEWED |

| PROGRAM TITLE | BROADCAST DATE/TIME | SPOT NAME | SPOT LOCATION | SPOT URL | DEGREE OF INTEREST |
|---|---|---|---|---|---|
| GOURMET VISIT TO TRADITIONAL AREA | 2013/03/09 08:00~10:00 | YYY CAFE | (xx1,yy1) | http://xx1··· | MIDDLE |
| GOURMET VISIT TO TRADITIONAL AREA | 2013/03/09 08:00~10:00 | ZZZ RESTAURANT | (xx2,yy2) | http://xx2··· | LOW |
| VISITS TO JAPANESE HOT SPRINGS | 2013/03/09 10:00~12:00 | CCC FALLS | (xx4,yy4) | http://xx4··· | MIDDLE |
| VISITS TO JAPANESE HOT SPRINGS | 2013/03/09 10:00~12:00 | AAA CHURCH | (xx5,yy5) | http://xx5··· | HIGH |

FIG. 27

| | SPOT SEARCH RANGE 2402 | | |
|---|---|---|---|
| DEGREE OF INTEREST | SHORT DISTANCE | MIDDLE DISTANCE | LONG DISTANCE |
| LOW | 100m | 300m | 1km |
| MIDDLE | 500m | 1km | 10km |
| HIGH | 500m | 2km | 10km |

SPOT NOTIFICATION METHOD, SPOT NOTIFICATION DEVICE, AND SPOT NOTIFICATION DEVICE PROGRAM

TECHNICAL FIELD

The present invention relates to a spot notification method, a spot notification device, and a spot notification program, each of which notifies the spot introduced in the program viewed to by a user.

BACKGROUND ART

In digital broadcasting, IPTV (Internet Protocol Television), VOD (Video On Demand), or the like, there are a large number of information programs each of which deals with travel information, gourmet information, or shopping information. To allow a user to visit the spot introduced in the information program after the broadcasting of the information program, the name of the spot or how to access the spot is introduced in the information program or in the website of the program.

In recent years, a mobile terminal equipped with a GPS (Global Positioning System) function, such as a mobile phone, has become prevalent.

For example, in the navigation device shown in Patent Literature 1, a spot corresponding to the center of a user's daily activity range is used as a reference spot. When the current location is in an area at an extremely short distance from the reference spot, no landmark figure is displayed. When the current location is in an area at a short distance from the reference spot, only the landmark figures of spots related to people's daily lives are displayed. When the current location is in an area at a middle distance from the reference spot, only the landmark figures of spots related to people's daily lives and leisure are displayed. When the current location is outside the area at the middle distance from the reference spot, only the landmark figures of spots related to people's daily lives, leisure, and lodging facilities are displayed.

A mobile terminal equipped with a GPS function provides a service which allows a user to specify an intended category or search condition and search for a spot present near the current location.

By using such a service, the user can perform a search to see whether or not the spot introduced in a program is present near the current location.

When the user remembers the name of the spot or the title of the program that has introduced the spot, such a service is effective. However, when the user has forgotten the name of the spot or the title of the program that has introduced the spot, the user cannot search for the spot.

There may be the case where, when the user viewed or listened to the program, he felt a desire to visit the spot introduced in the program but, as time advanced, the user forgot the desire he felt. In that case, even when the user passes by the spot introduced in the program, he is unable to visit the spot.

CITATION LIST

Patent Literature

Patent Literature 1: Japanese Unexamined Patent Publication No. 2010-243186

SUMMARY OF INVENTION

The present invention has been achieved in order to solve the problem described above and an object thereof is to provide a spot notification method, a spot notification device, and a spot notification program which can reliably notify the spot introduced in the program viewed to by a user.

A spot notification method according to an aspect of the present invention is a spot notification method of notifying a spot introduced in a program viewed to by a user and includes: a viewing history acquisition step of acquiring a program viewing history of the user; a program data acquisition step of acquiring program data including a name and locational information on the spot introduced in the program; a generation step of generating, on the basis of the acquired viewing history and the acquired program data, a spot list including the name and locational information on the spot introduced in the program viewed to by the user; a location acquisition step of acquiring a current location of the user; an activity history holding step of holding the acquired current location in time series as an activity history; a search range setting step of setting a search range in accordance with the activity history; a search step of referring to the spot list and searching for the spot present within the set search range; and a notification step of notifying the user of information related to the spot that has been searched for.

According to the present invention, the search range is set in accordance with the activity history showing the current location of the user in time series and the information relating to the spot present within the set search range is notified the user. Therefore, it is possible to reliably notify the spot introduced in the program viewed to by the user with proper timing.

BRIEF DESCRIPTION OF DRAWINGS

FIG. 4 is a view showing an example of program metadata held in a program metadata server in Embodiment 1 of the present invention.

FIG. 5 is a view showing an example of a program viewing history acquired from television or a hard disk recorder in Embodiment 1 of the present invention.

FIG. 6A is a view showing an example of a spot list generated on a predetermined day in Embodiment 1 of the present invention and FIG. 6B is a view showing an example of the spot list generated on the next day of the predetermined day in Embodiment 1 of the present invention.

FIG. 7A is a view showing an example of an activity history held on a predetermined day in Embodiment 1 of the present invention and FIG. 7B is a view showing an example of the activity history held on the next day of the predetermined day in Embodiment 1 of the present invention.

FIG. 16 is a view showing an example of program metadata held in a program metadata server in Embodiment 2 of the present invention.

FIG. 17 is a view showing an example of a spot list produced on the basis of the program metadata and a program viewing history in Embodiment 2.

FIG. 18 is a view showing an example of a spot search range determination table in Embodiment 2.

FIG. 19 is a view showing an example of a spot notification determination table in Embodiment 2.

FIG. 23 is a view showing an example of program metadata held in a program metadata server in Embodiment 3 of the present invention.

FIG. 24 is a view showing an example of a program viewing history acquired from a television or a hard disk recorder in Embodiment 3.

FIG. 25 is a view showing an example of a spot list generated on the basis of the program metadata and a program viewing history in Embodiment 3.

FIG. 27 is a view showing an example of a spot search range table in Embodiment 3.

DESCRIPTION OF EMBODIMENTS

Referring to the accompanying drawings, a description will be given below of the embodiments of the present invention. Note that each of the following embodiments is an example embodying the present invention and is not intended to limit the technical scope of the present invention.

Figure 1:
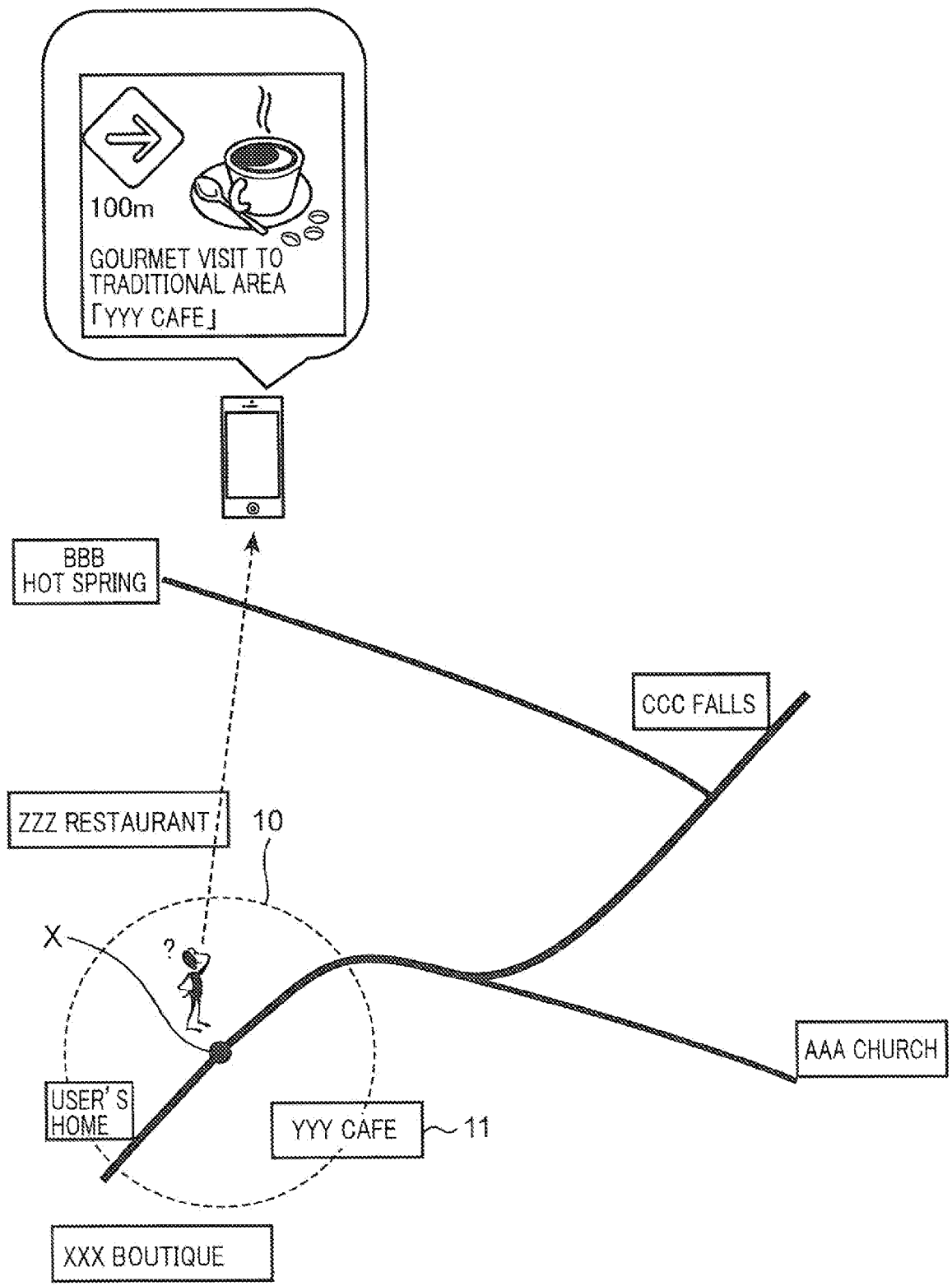
FIG. 1 is a view for illustrating the outline of a spot notification system in the present embodiment.

FIG. 1 is a view for illustrating the outline of a spot notification system in the present embodiment. For example, a user views/listens to a travel program or a gourmet program and then goes out. At this time, the spot notification system searches for the spot introduced in the program viewed/listened to around a point X where the user is situated. When the spot introduced in the program viewed/listened to by the user is in the vicinity of the current location, the spot notification system notifies the user of information related to the spot via a mobile terminal.

For example, it is assumed that the user viewed/listened to a program titled "Gourmet Visit to Traditional Area" and "YYY Cafe" was introduced in the program. When the user is situated at the point X, the spot notification system sets the inside of a circle around the point X to a spot search range 10 and searches for the spot introduced in the program viewed/listened to within the spot search range 10. At this time, "YYY Cafe 11" is retrieved by the search. Then, the mobile terminal of the user shows an image representing the type (Cafe) of the retrieved spot, a text image representing the title of the program that has introduced the spot, which is "Gourmet Visit to Traditional Area", and a text image representing the name of the spot, which is "YYY Cafe", as well as guidance information for showing the location of the retrieved "YYY Cafe".

This allows the user who has walked from the user's home and reached the point X to know that the "YYY Cafe 11" introduced in the program previously viewed/listened to is near the current location.

Embodiment 1

Embodiment 1 relates to a spot notification method in which a spot search range is changed in accordance with the activity history of the user.

Figure 2:
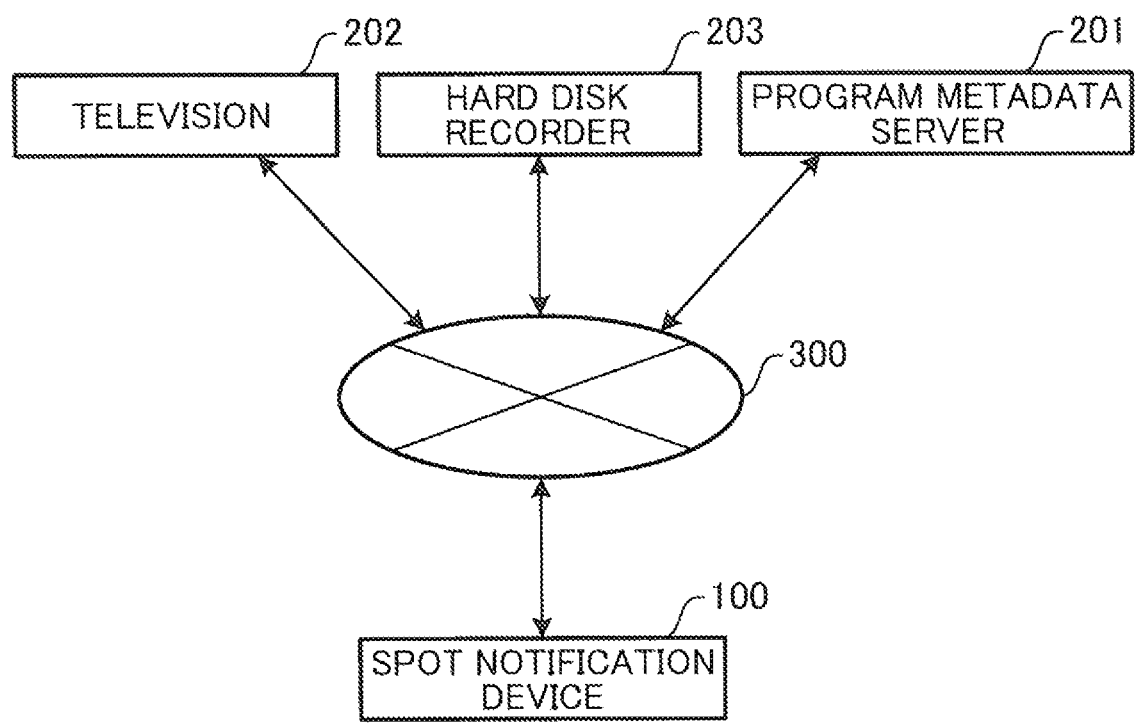
FIG. 2 is a view showing an example of the overall configuration of a spot notification system in Embodiment 1 of the present invention.

FIG. 2 is a view showing an example of the overall configuration of a spot notification system in Embodiment 1 of the present invention.

A spot notification device 100 acquires the program viewing history of the user from a television 202 or a hard disk recorder 203 via a network 300. The spot notification device 100 also acquires program metadata including the name and locational information on the spot introduced in the program from a program metadata server 201 via the network 300. Thus, the spot notification device 100 can acquire the information related to the spot introduced in the program viewed by the user. As the spot notification device 100, a mobile terminal such as a mobile phone, a smart phone, or a tablet terminal is preferably used on the assumption that the user carries the spot notification device 100 when he goes out. The spot notification device 100 may also be a car navigation device. On the other hand, the network 300 is, e.g., the Internet.

The television 202 stores the program viewing history of the user. The hard disk recorder 203 stores the program viewing history of the user. Alternatively, the hard disk recorder 203 reproduces the stored programs to store the viewing history of the programs viewed by the user.

The cases are assumed where the program metadata acquired from the program metadata server 201 is produced by a broadcaster and where the program metadata acquired from the program metadata server 201 is produced by a program metadata producer from program images. Note that, when the program metadata is managed by a plurality of program metadata servers on a per broadcaster basis, the spot notification device 100 acquires program metadata from the plurality of program metadata servers.

Figure 3:
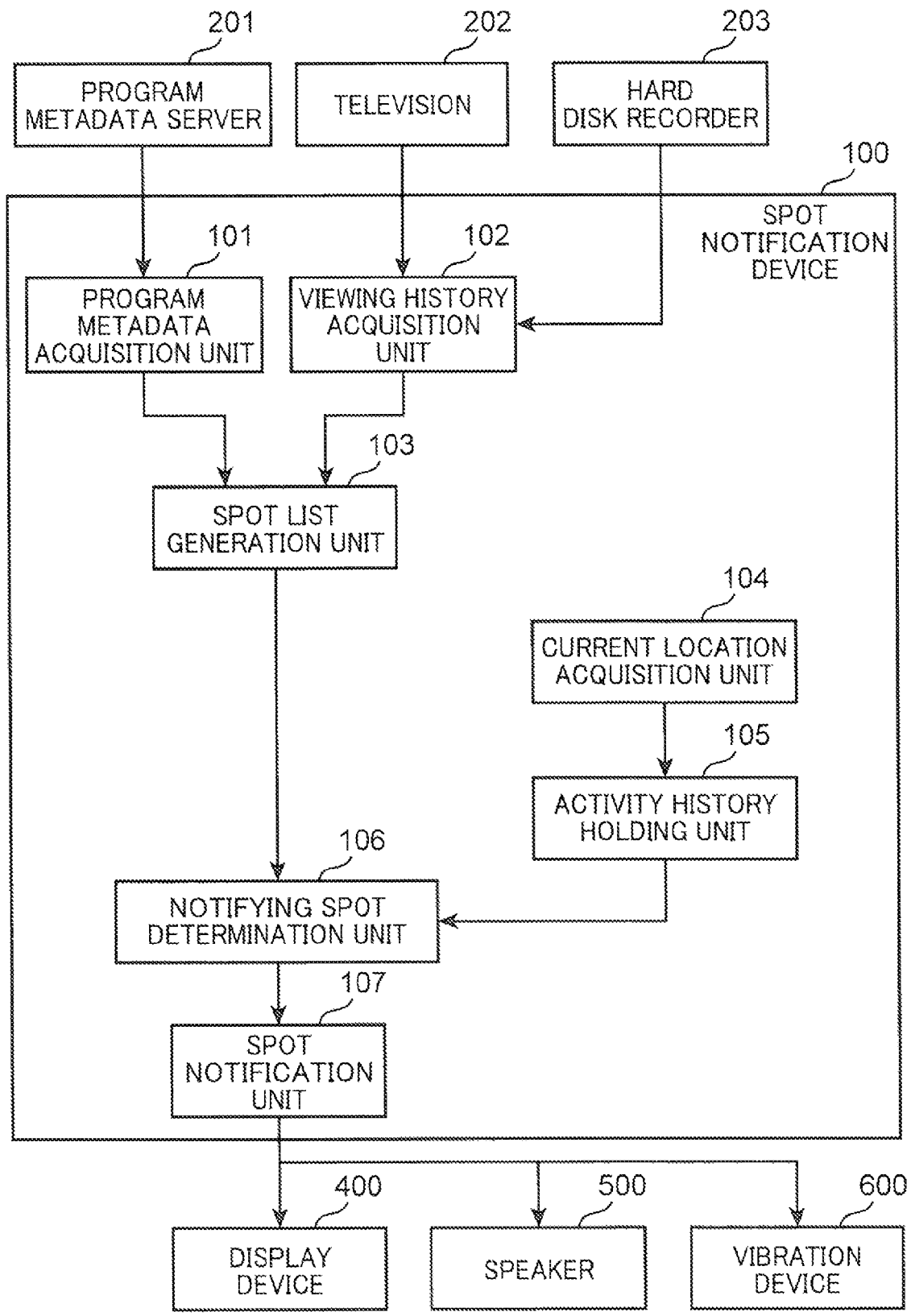
FIG. 3 is a view showing an example of a configuration of a spot notification device in Embodiment 1 of the present invention.

FIG. 3 is a view showing an example of a configuration of the spot notification device in Embodiment 1 of the present invention. The spot notification device 100 includes a program metadata acquisition unit 101, a viewing history acquisition unit 102, a spot list generation unit 103, a current location acquisition unit 104, an activity history holding unit 105, a notifying spot determination unit 106, and a spot notification unit 107.

The spot notification device 100 may also include a display device 400, a speaker 500, and a vibration device 600 as an output unit which notifies the user of a spot. The spot notification device 100 need not include any of the display device 400, the speaker 500, and the vibration device 600. Alternatively, the spot notification device 100 may also include at least one of the display device 400, the speaker 500, and the vibration device 600.

The program metadata acquisition unit 101 acquires program metadata from the program metadata server 201 at regular time intervals or with timing which satisfies a preliminarily specified condition. The program metadata acquisition unit 101 acquires program metadata including the name and locational information on the spot introduced in the program.

FIG. 4 is a view showing an example of the program metadata held in the program metadata server in Embodiment 1 of the present invention. Program metadata 31 includes a program title, a broadcast date/time, a spot name, and a spot location.

The program title is the title of the broadcast program. The broadcast date/time is the date/time when the program was broadcast. In the present embodiment, it is assumed that the program is identified by a combination of the program title and the broadcast date/time. Since it is sufficient that the program is associated with the program metadata and the program viewing history, the program may also be associated with program metadata and the program viewing history using a program identifier which allows the program to be uniquely identified or the like, not the program title and the broadcast date/time. In this case, the program metadata may also include the program identifier.

The spot name is the name of the spot introduced in the program. The spot location is the locational information on the spot introduced in the program. In the present embodiment, the spot location is expressed using a latitude and a longitude. In FIG. 4, the spot location (xx1, yy1) shows that the latitude is "xx1" and the longitude is "yy1". Since it is sufficient for the spot location to allow the location of the spot to be specified, the spot location may also be expressed using an address or a GPS value.

To show not only the program title and the spot name but also detailed information on the spot to the user who has reached the vicinity of the spot, the program metadata may also include a spot URI (Uniform Resource Locator). The spot URL is information showing the address of the website having the detailed information on the spot.

Since one program may introduce a plurality of spots, as shown in FIG. 4, a plurality of sets of spot names, spot locations, and spot URLs may be included in one program.

Note that the program metadata may also include the opening hours of the spot. The opening hours are the hours during which the spot is open. Even though the user is near the spot, when the current time is out of the opening hours of the spot, it is desirable not to notify the use of the spot. By including the opening hours of the spot, the program metadata allows the spot to be notified with more proper timing.

The viewing history acquisition unit 102 acquires the program viewing history of the user from the television 202 or the hard disk recorder 203 at regular time intervals or with timing which satisfies a preliminarily specified condition.

FIG. 5 is a view showing an example of the program viewing history acquired from the television or the hard disk recorder in Embodiment 1 of the present invention. A program viewing history 41 includes the program title and the broadcast date/time.

The program title is the title of the broadcast program. The broadcast date/time is the date/time when the program was broadcast. In the present embodiment, it is assumed that the program is identified by the combination of the program title and the broadcast date/time. Since it is sufficient that the program is associated with the program metadata and the program viewing history, the program may also be associated with the program metadata and the program viewing history using not the program title and the broadcast date/time, but a program identifier which allows the program to be uniquely identified. In this case, the program viewing history may also include the program identifier.

The spot list generation unit 103 acquires the program viewing history of the user from the viewing history acquisition unit 102 at regular time intervals or with timing which satisfies a preliminarily specified condition, acquires program metadata corresponding to the program viewed by the user from the program metadata server 201 and generates a spot list in which spot information items related to the spot introduced in the program viewed by the user are listed. The spot list generation unit 103 generates a spot list including the name and locational information on the spot introduced in the program viewed by the user on the basis of the acquired program viewing history and the acquired program metadata.

FIG. 6A is a view showing an example of the spot list generated on a predetermined day in Embodiment 1 of the present invention. FIG. 6B is a view showing an example of the spot list generated on the next day of the predetermined day. Each of spots lists 51 and 52 includes a program title, a broadcast date/time, a spot name, and a spot location. Each of the spot lists 51 and 52 may also include the spot URL. The individual information items of the program title, the broadcast date/time, the spot name, the spot location, and the spot URL are the same as the individual information items of the program metadata 31 shown in FIG. 4, hence a description thereof is omitted.

The spot list generation unit 103 holds the generated spot list. The spot list generation unit 103 adds a newly generated spot list to the previously generated spot list.

For example, when there is the spot list 51 (FIG. 6A) generated for the program viewing history up to the previous May and a new spot list is generated today, the spot list generation unit 103 holds the latest spot list 52 (FIG. 6B) created by adding the spot list generated today to the spot list 51 covering data up to the day before.

Note that a spot list is added every time a program is viewed but, when a predetermined condition is satisfied, the spot list generation unit 103 may delete a spot information item from the spot list. For example, the spot list generation unit 103 may delete a spot information item which has undergone a lapse of a predetermined time (e.g., one year) after the addition thereof to the spot list, the spot information item of the spot that has been notified the user as the spot to be notified, and the like.

Note that the timing with which the viewing history acquisition unit 102 acquires the program viewing history from the television 202 or the hard disk recorder 203 need not necessarily be the same as the timing with which the spot list generation unit 103 generates the spot list. When the both timings are not the same, the viewing history acquisition unit 102 holds the program viewing history until the timing of generating the spot list. Also, the timing with which the program metadata acquisition unit 101 acquires the program metadata from the program metadata server 201 need not necessarily be the same as the timing with which the spot list generation unit 103 generates the spot list. When the both timings are not the same, the program metadata acquisition unit 101 holds the program metadata until the timing of generating the spot list.

The program metadata acquisition unit 101 need not acquire the program metadata of all the broadcast programs. The program metadata acquisition unit 101 may also acquire the program metadata of only the programs viewed by the user using the program viewing history acquired by the viewing history acquisition unit 102. In this case, the program metadata acquisition unit 101 specifies the programs viewed by the user using the program viewing history acquired by the viewing history acquisition unit 102 and gives a request for the program metadata of the specified programs to the program metadata server 201. In response to the request from the program metadata acquisition unit 101, the program metadata server 201 transmits only the program metadata of the programs viewed by the user.

The current location acquisition unit 104 acquires the current location of the user at regular time intervals or with timing which satisfies a preliminarily specified condition and notifies the activity history holding unit 105 of the current location of the user. The current location acquisition unit 104 acquires the current location, e.g., every five minutes and notifies the activity history holding unit 105 of the current location.

The activity history holding unit 105 holds, together with date/time information, the locational information notified from the current location acquisition unit 104 as an activity history. The activity history holding unit 105 holds the acquired current location in time series as the activity history.

FIG. 7A is a view showing an example of the activity history held on a predetermined day in Embodiment 1 of the present invention. FIG. 7B is a view showing an example of the activity history held on the next day of the predetermined day in Embodiment 1 of the present invention. The activity history includes a date/time and user locational information.

The date/time is the date/time when the current location was acquired. The user locational information shows the location of the user at the time when the current location was acquired. In the present embodiment, the user locational information is expressed using a latitude and a longitude. In FIGS. 7A and 7B, the user locational information (aa1, bb1) shows that the latitude is aa1 and the longitude is bb1. Since it is sufficient for the user locational information to allow the location of the user to be specified, the user locational information may also be expressed using an address or a GPS value.

The notifying spot determination unit 106 acquires the activity history from the activity history holding unit 105 at regular time intervals or timing which satisfies a preliminarily specified condition and sets the search range in accordance with the activity history. The notifying spot determination unit 106 acquires a spot list from the spot list generation unit 103 at regular time intervals or timing which satisfies a preliminarily specified condition and also acquires the activity history from the activity history holding unit 105 to search for the spot to be notified the user in the spot list on the basis of the search range set in accordance with the activity history. When there is the spot to be notified the user, the notifying spot determination unit 106 gives an instruction to notify the use of the spot to the spot notification unit 107. The notifying spot determination unit 106 refers to the spot list to search for the spot present within the set search range.

The spot search range includes a first spot search range having a first radial distance, a second spot search range having a second radial distance longer than the first radial distance, and a third spot search range having a third radial distance longer than the second radial distance. The notifying spot determination unit 106 determines whether or not the acquired current location is included in an activity history over a predetermined period. On determining that the acquired current location is included in the activity history over the predetermined period, the notifying spot determination unit 106 sets the spot search range to the first spot search range. On determining that the acquired current location is not included in the activity history over the predetermined period, the notifying spot determination unit 106 determines whether or not the acquired current location is included in an activity history over a period preceding the predetermined period. On determining that the acquired current location is included in the activity history over the period preceding the predetermined period, the notifying spot determination unit 106 sets the spot search range to the second spot search range. On determining that the acquired current location is not included in the activity history over the period preceding the predetermined period, the notifying spot determination unit 106 sets the spot search range to the third spot search range.

The spot notification unit 107 notifies the user of information related to the spot retrieved by the search using the display device 400, the speaker 500, the vibration device 600, or the like. The spot notification unit 107 notifies that the spot introduced in the program viewed by the user is present in the vicinity of the current location.

The user can receive the notification of the spot by viewing an image, a moving image, or a text displayed on the display device 400, listening to a voice/sound output from the speaker 500, or feeling vibration generated by the vibration device 600.

Note that, in the present embodiment, the viewing history acquisition unit 102 corresponds to an example of a viewing history acquisition unit. The program metadata acquisition unit 101 corresponds to an example of a program data acquisition unit. The spot list generation unit 103 corresponds to an example of a generation unit. The current location acquisition unit 104 corresponds to an example of a location acquisition unit. The activity history holding unit 105 corresponds to an example of an activity history holding unit. The notifying spot determination unit 106 corresponds to an example of a search range setting unit and a search unit. The spot notification unit 107 corresponds to an example of a notification unit.

Figure 8:
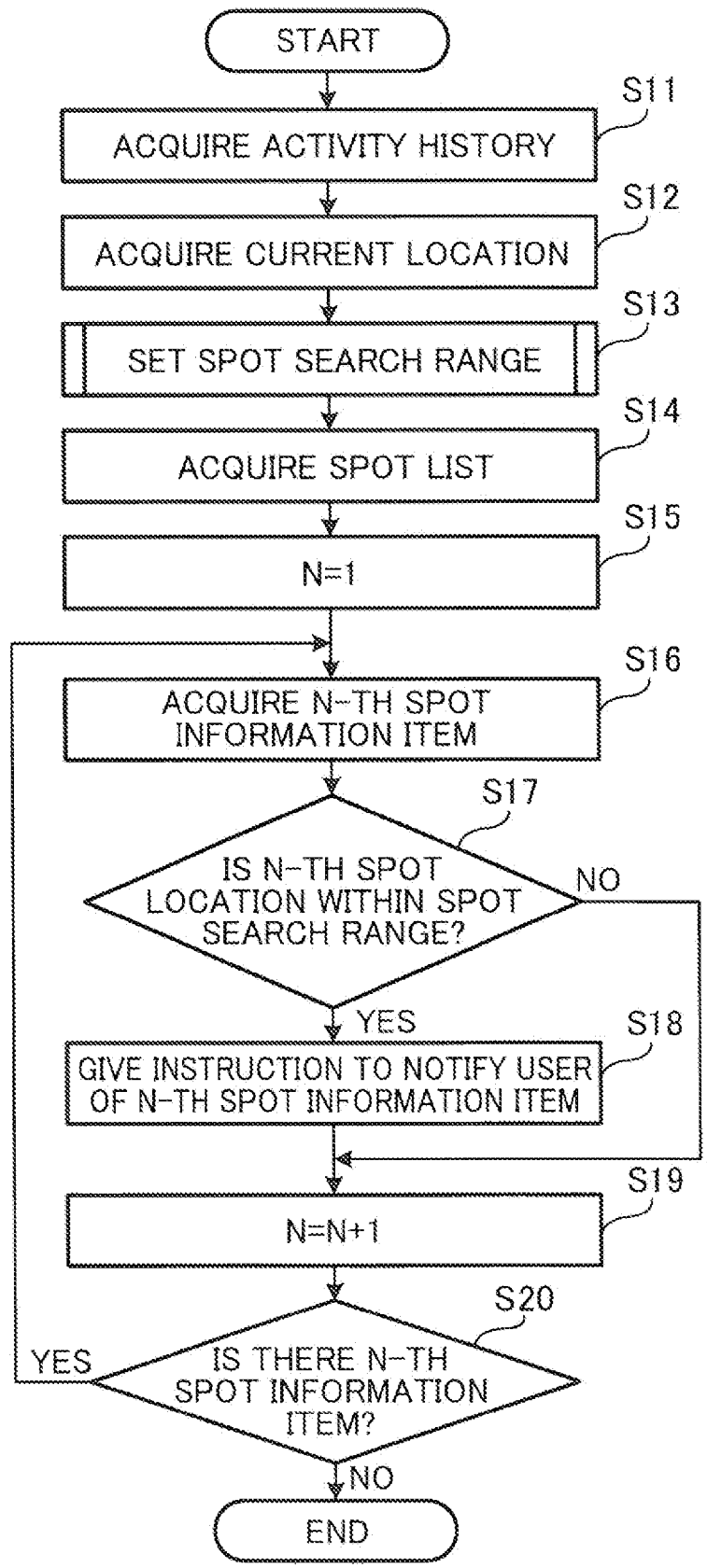
FIG. 8 is a flow chart showing an example of processing in a notification spot determination unit in Embodiment 1.

FIG. 8 is a flow chart showing an example of processing in the notifying spot determination unit 106 in Embodiment 1. The flow chart shown in FIG. 8 shows an example of a procedure in which the notifying spot determination unit 106 acquires a spot list and an activity history, searches for the spot to be notified the user, and finally gives an instruction to notify the use of the spot.

First, the notifying spot determination unit 106 acquires the activity history from the activity history holding unit 105 (Step S11).

Next, the notifying spot determination unit 106 acquires the current location of the user (Step S12). The notifying spot determination unit 106 may give an instruction to acquire the current location to the current location acquisition unit 104 and acquire the current location from the current location acquisition unit 104 or may acquire the latest user locational information in the activity history as the current location. It is assumed that the current location acquisition unit 104 acquires the current location at regular time intervals or with timing which satisfies a preliminarily specified condition. However, when the timing with which the notifying spot determination unit 106 acquires the activity history is the same as the timing with which the current location acquisition unit 104 acquires the current location, the latest user locational information held in the activity history corresponds to the current location.

Next, the notifying spot determination unit 106 sets the spot search range (Step S13). Note that the details of the process of setting the spot search range will be described later using FIG. 10.

Next, the notifying spot determination unit 106 acquires the spot list from the spot list generation unit 103 (Step S14).

Note that the timing with which the notifying spot determination unit 106 acquires the spot list need not necessarily be the same as the timing with which the spot list generation unit 103 generates the spot list.

Next, the notifying spot determination unit 106 enters 1 in a variable N (Step S15).

Next, the notifying spot determination unit 106 acquires the N-th spot information item from the spot list (Step S16).

Figure 9:
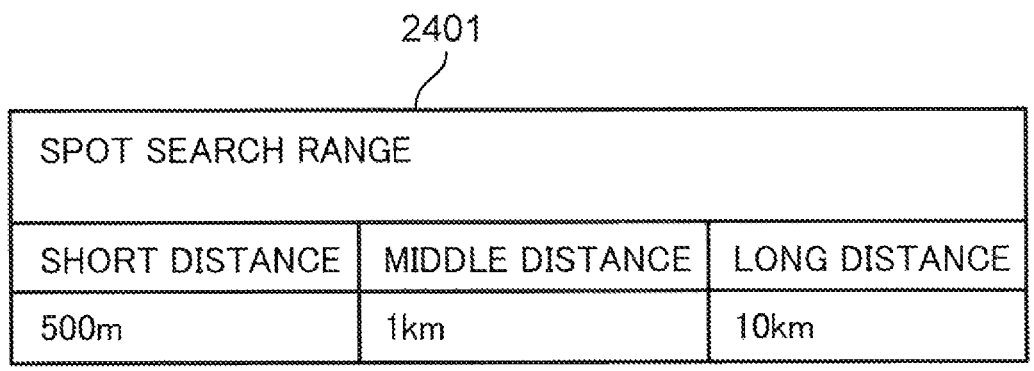
FIG. 9 is a view showing an example of a spot search range table in Embodiment 1.

Next, the notifying spot determination unit 106 determines whether or not the spot location included in the N-th spot information item is within the spot search range (Step S17). Here, FIG. 9 is a view showing an example of a spot search range table in Embodiment 1. In Embodiment 1, a spot search range table 2401 is a table for specifying, when the spot search range is set to any of a short distance, a middle distance, and a long distance, a radial distance from the current location corresponding to the category of the short distance, middle distance, or long distance to which the spot search range has been set. The spot search range table 2401 has been held in advance in the notifying spot determination unit 106.

For example, when the spot search range is set to the short distance in Step S13, the notifying spot determination unit 106 searches for the spot location using the spot search range table 2401 and using a circle having a radius of 500 m around the current location as the spot search range. When the spot search range is set to the middle distance in Step S13, the notifying spot determination unit 106 searches for the spot location using the spot search range table 2401 and using a circle having a radius of 1 km around the current location as the spot search range. When the spot search range is set to the long distance in Step S13, the notifying spot determination unit 106 searches for the spot location using the spot search range table 2401 and using a circle having a radius of 10 km around the current location as the spot search range.

On determining that the spot location included in the N-th spot information item is within the spot search range (YES in Step S17), the notifying spot determination unit 106 gives an instruction to notify the user of the N-th spot information item (Step S18). Specifically, the spot notification unit 107 notifies the user of the presence of the spot using the speaker 500 or the vibration device 600 or notifies the user of the program title or the spot name using the display device 400.

On the other hand, on determining that the spot location included in the N-th spot information item is not within the spot search range (NO in Step S17) or when the processing in Step S18 is ended, the notifying spot determination unit 106 increases the value of the variable N by 1 (Step S19).

Next, the notifying spot determination unit 106 determines whether or not there is the N-th spot information item (Step S20). On determining that there is the N-th spot information item (YES in Step S20), the notifying spot determination unit 106 returns to the processing in Step S16. On the other hand, on determining that there is no N-th spot information item (NO in Step S20), the notifying spot determination unit 106 ends the process.

Note that, when the opening hours of the spot is included in the program metadata, after determining that the spot location included, in the N-th spot information item is within the spot search range in Step S17, the notifying spot determination unit 106 may also determine whether or not the current time is within the opening hours of the spot included in the N-th spot information item, though not shown in the flow chart described above. On determining that the current time is within the opening hours, the notifying spot determination unit 106 gives an instruction to notify the user of the spot. On determining that the current time is not within the opening hours, the notifying spot determination unit 106 moves to the processing in Step S19.

When the spot list has a plurality of the spots determined to be notified, i.e., the spots each having the spot location included in the N-th spot information item and determined to fall within the spot search range in Step S17, the spot notification unit 107 may notify the user of the spots in succession or notify the user of all the plurality of spots at one time. When all the plurality of spots are notified at a time, it follows that the display device 400 displays information related to the plurality of spots. The spot notification unit 107 may also notify the user of only some of the plurality of spots retrieved by the search. For example, the spot notification unit 107 may also give priorities to the spots in reverse chronological order of broadcast date, in order of increasing distance from the current location, or the like and notify some of the spots having higher priorities.

Figure 10:
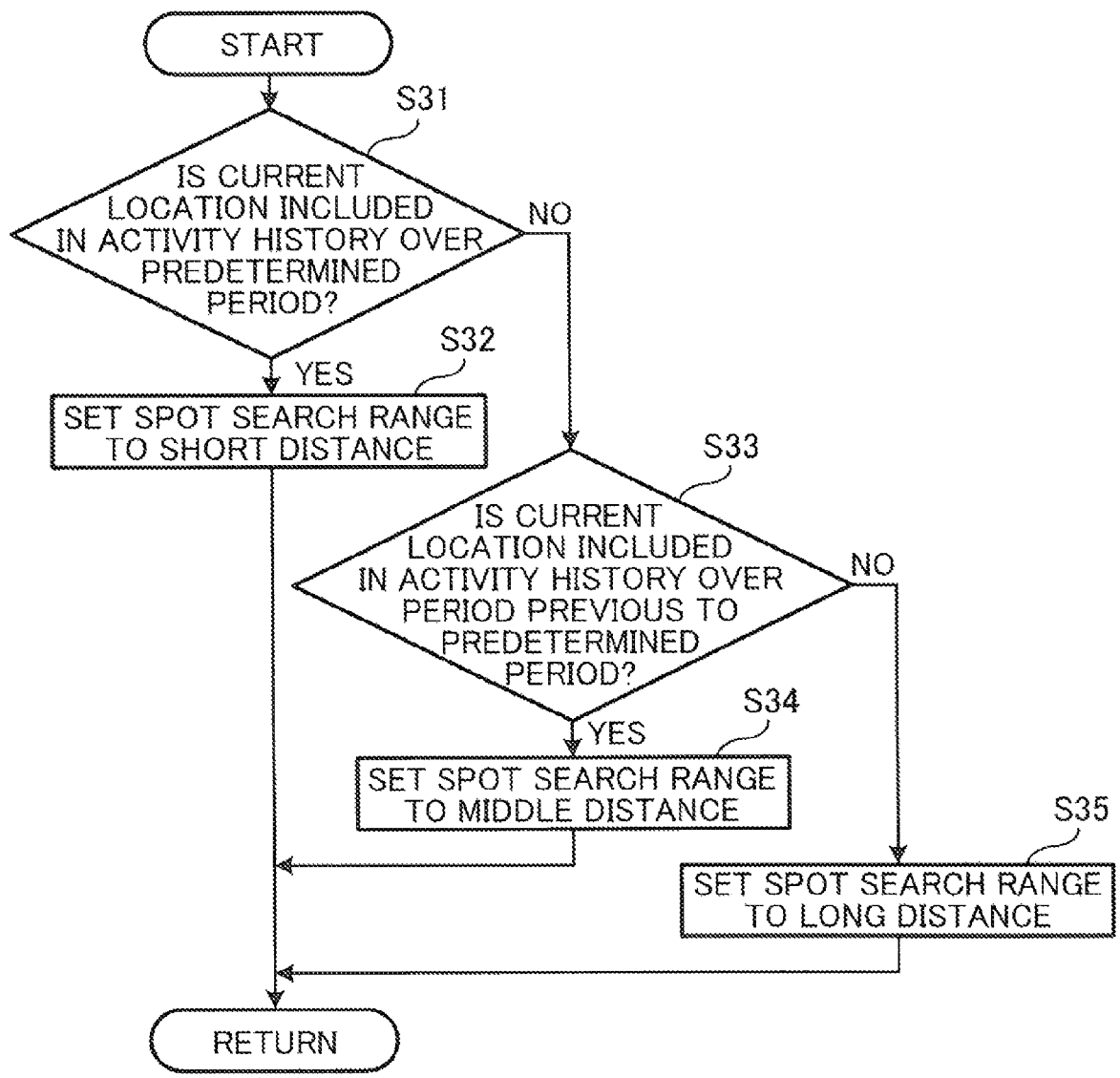
FIG. 10 is a flow chart showing an example of a spot-search-range determination process in Step S13 of FIG. 8.

FIG. 10 is a flow chart showing an example of the spot search range determination process in Step S13 of FIG. 8.

First, the notifying spot determination unit 106 determines whether or not the current location is included in an activity history over a predetermined period (Step S31). That is, the notifying spot determination unit 106 determines whether or not the current location is within the range of daily activities of the user. Whether or not the current location is within the range of daily activities is determined on the basis of e.g., whether or not the user visited the current location during the past one week.

Specifically, the notifying spot determination unit 106 determines whether or not the activity history includes the user locational information existing in a circle having a radius of 1 km around the current location. On determining that the activity history includes the user locational information existing in the circle having the radius of 1 km around the current location, the notifying spot determination unit 106 determines whether or not the user locational information is in the period of the past one week up to the previous day. When the user locational information is in the period of the past one week up to the previous day, the notifying spot determination unit 106 determines that the current location is within the range of daily activities.

On determining that the current location is included in the activity history over the predetermined period (YES in Step S31), the notifying spot determination unit 106 sets the spot search range to the short distance and ends the process (Step S32).

On the other hand, on determining that the current location is not included in the activity history over the predetermined period (NO in Step S31), the notifying spot determination unit 106 determines whether or not the current location is included in an activity history over a period preceding the predetermined period (Step S33). That is, the notifying spot determination unit 106 determines whether or not the user has visited the current location before. Whether or not the user has visited the current location before is determined on the basis of, e.g., whether or not the user visited the current location during the past one year.

Specifically, the notifying spot determination unit 106 determines whether or not the activity history includes the user locational information existing in the circle having the radius of 1 km around the current location. On determining that the activity history includes the user locational information existing in the circle having the radius of 1 km around the current location, the notifying spot determination unit 106 determines whether or not the user locational information is in the period of the past one year up to the previous day. When the user location information is in the period of the past one year up to the previous day, the notifying spot determination unit 106 determines that the user has visited the current location before.

On determining that the current location is included in the activity history over the period preceding the predetermined period (YES in Step S33), the notifying spot determination unit 106 sets the spot search range to the middle distance and ends the process (Step S34).

On the other hand, on determining that the current location is not included in the activity history over the period preceding the predetermined period (NO in Step S33), the notifying spot determination unit 106 sets the spot search range to the long distance and ends the process (Step S35).

In the present embodiment, whether or not the user has visited the current location is determined on the basis of whether or not the activity history includes the user locational information existing in the circle having the radius of 1 km around the current location. However, the present invention is not limited thereto. For example, as the distance used for the determination, another distance other than the radius of 1 km may also be used.

In the present embodiment, the spot search range is subdivided into the three categories of the short distance, the middle distance, and the long distance on the basis of the activity history. However, a categorization method for the spot search range is not limited thereto. The categorization method may also involve the two categories of the short distance and the long distance or the four or more categories.

It has been assumed that the spot search range is in a circle having a radius of X in around the current location. However, the present invention is not limited thereto. For example, the spot search range may be an ellipse having a range which increases in the direction of travel of the user.

The spot search range need not be categorized on the basis of a distance. For example, the spot search range may be subdivided into the categories of e.g., a town, a city, or a prefecture depending on the size of an area. Alternatively, the spot search range may also be subdivided into the categories of a short time, a middle time, or a long time on the basis of the time required for the movement from the current location to the spot. In this case, if there are a spot which is at a distance of 1 km from the current location but is accessible only by foot and a spot which is at a distance of 10 km from the current location but is accessible by train, the spot accessible by train is categorized into the short distance. Thus, the categorization based on a movement time and the categorization based on a distance may possibly have opposite results.

Also, in the example of the spot search range determination process shown in FIG. 10, the notifying spot determination unit 106 sets the spot search range on the basis of whether or not the user visited the current location during a past predetermined period. However, the spot search range determination process is not limited thereto.

For example, the notifying spot determination unit 106 may also count the number of times the user entered a predetermined range including the current location (e.g., range in a circle having a radius of 1 km around the current location) and set the spot search range in accordance with the number of times. Specifically, notifying spot determination unit 106 may count up by one every time the user enters the predetermined range including the current location and exits therefrom and set the spot search range to the short distance when the total number of times within a year is not less than 50, set the spot search range to the middle distance when the total number of times within a year is not less than 5, or set the spot search range to the long distance when the total number of times within a year is less than 5.

The notifying spot determination unit 106 may also measure a stay time during which the user stays in the predetermined range including the current location (e.g., range in a circle having a radius of 1 km around the current location) and set the spot search range in accordance with the stay time. Specifically, the notifying spot determination unit 106 may calculate a stay time from the entrance of the user into the predetermined range including the current location to the exit therefrom from the date/time when the user entered the predetermined range including the current location and the date/time when the user exited from the predetermined range including the current location and set the spot search range to the short distance when the total stay time within a year is not less than 10 hours, set the spot search range to the middle distance when the total stay time within a year is not less than 1 hour, or set the spot search range to the long distance when the total stay time within a year is less than 1 hour.

The notifying spot determination unit 106 may also calculate a moving speed while the user stays in a predetermined range including a current location e.g., range in a circle having a radius of 1 km around the current location) and set the spot search range in accordance with the moving speed. Specifically, the notifying spot determination unit 106 calculates the moving speed during the period from the entrance of the user into the predetermined range including the current location to the exit therefrom from the dates/times and the user locational information. That is, when the interval between the first date/time and the second date/time is 5 minutes and the distance between the first user location and the second user location is 1 km, a speed per hour is 12 km. For example, the notifying spot determination unit 106 may calculate an average moving speed, a highest moving speed, or a lowest moving speed while the user stays in the predetermined range including the current location and set the spot search range to the short distance when the average moving speed, the highest moving speed, or the lowest moving speed is not more than 3 km/h, set the spot search range to the middle distance when the average moving speed, the highest moving speed, or the lowest moving speed is not more than 5 km/h, or set the spot search range to the long distance when the average moving speed, the highest moving speed, or the lowest moving speed is not less than 5 km/h.

The notifying spot determination unit 106 may also preliminarily receive the registration of a place frequently used by the user and set the spot search range using the registration information. For example, the notifying spot determination unit 106 may preliminarily receive the registration of the user's home, working location, commuting route, or the like and set the spot search range to the short distance when the current location is in the vicinity of his home (e.g., range in a circle having a radius of 1 km around the user's home), in the vicinity of the working location, or in the vicinity of the commuting route or set the spot search range to the long distance when the current location is not in the vicinity of any of his home, the working location, and the commuting route.

Figure 11:
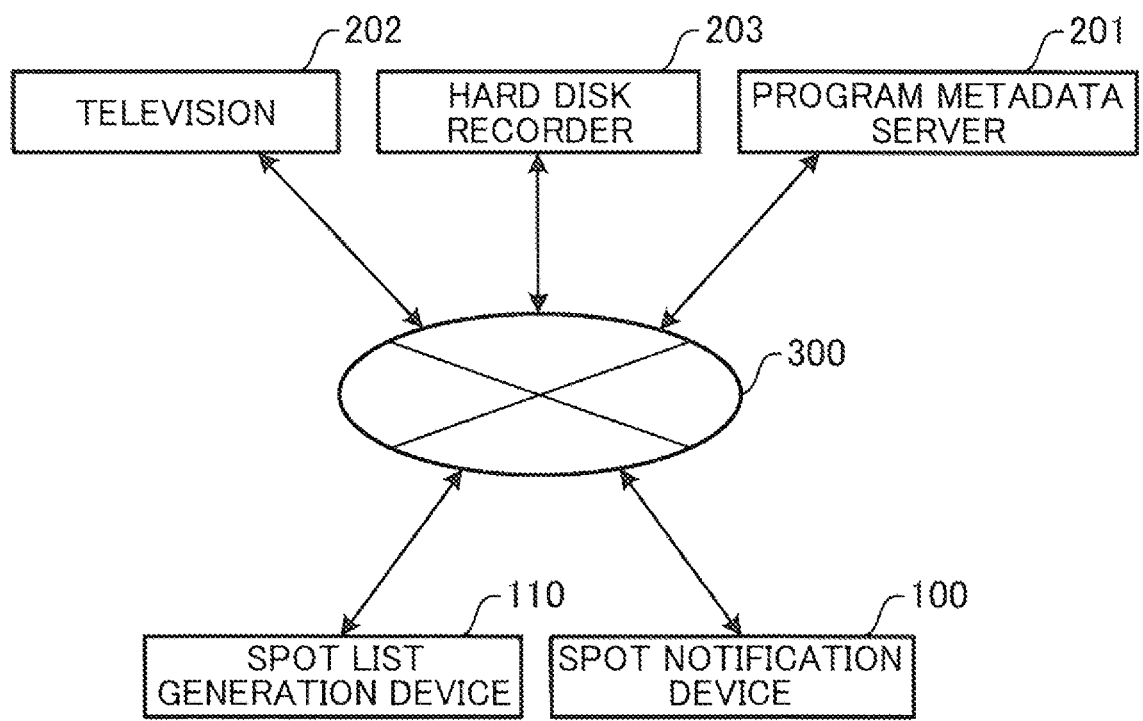
FIG. 11 is a view showing an example of the overall configuration of a spot notification system in a modification of Embodiment 1 of the present invention.

FIG. 11 is a view showing an example of the overall configuration of a spot notification system in a modification of Embodiment 1 of the present invention. Unlike the spot notification system shown in FIG. 2, the spot notification system shown in FIG. 11 includes a spot list generation device 110 which acquires a program viewing history and a program metadata to generate a spot list and the spot notification device 100 which searches for the spot to be notified in the activity history and the spot list and notifies the user of the spot.

The spot list generation device 110 is communicatably connected to the program metadata server 201, the television 202, and the hard disk recorder 203 via the network 300. The spot notification device 100 is communicatably connected to the spot list generation device 110 via the network 300.

Figure 12:
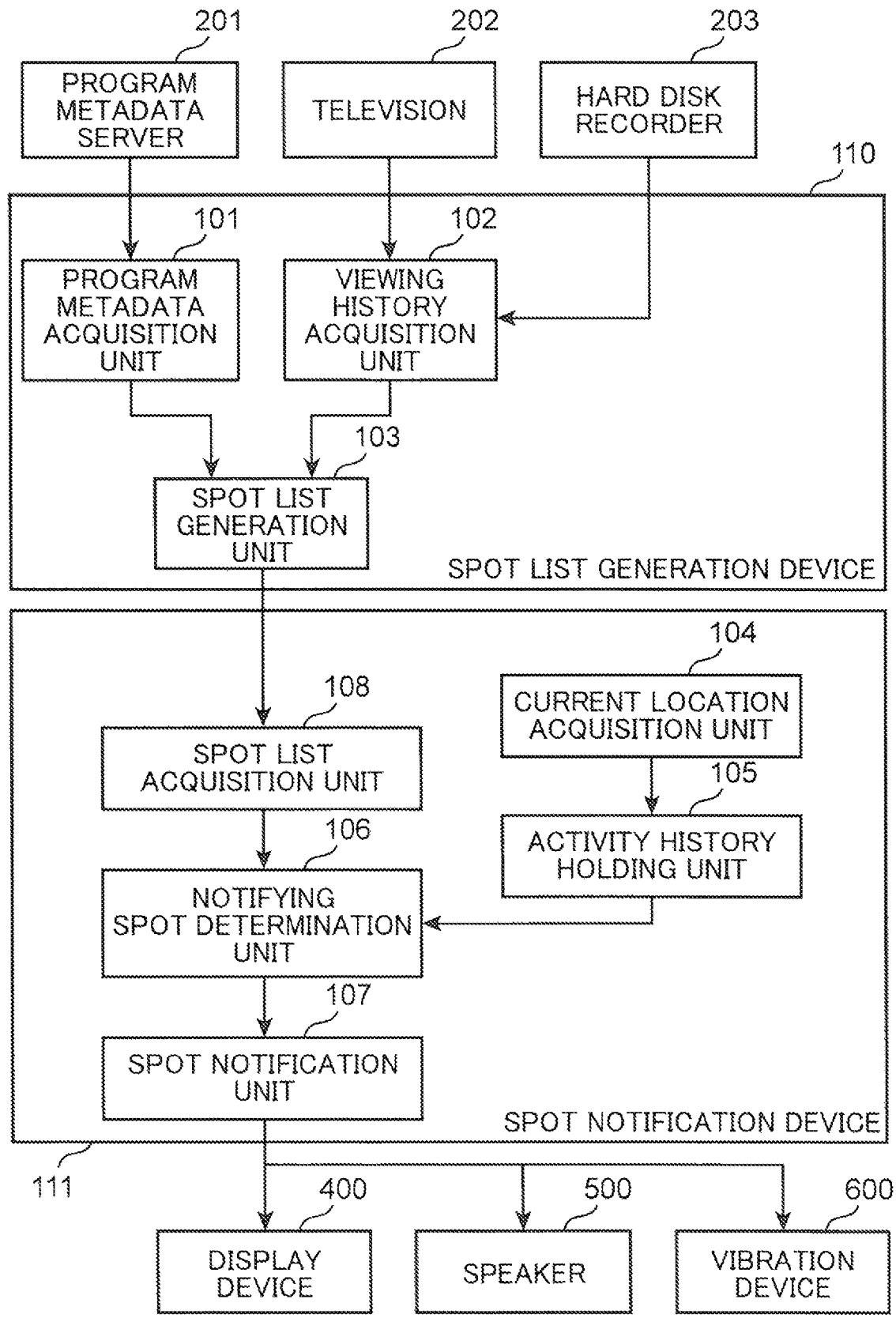
FIG. 12 is a view showing an example of a configuration of a spot notification device in the modification of Embodiment 1 of the present invention.

FIG. 12 is a view showing an example of a configuration of a spot notification device in the modification of Embodiment 1 of the present invention. The spot list generation device 110 includes the program metadata acquisition unit 101, the viewing history acquisition unit 102, and the spot list generation unit 103. The configurations of the program metadata acquisition unit 101, the viewing history acquisition unit 102, and the spot list generation unit 103 are the same as in FIG. 3 so that a description thereof is omitted.

The spot list generation unit 103 transmits the generated spot list to the spot notification device 100.

The spot notification device 111 includes the spot list acquisition unit 108, the current location acquisition unit 104, the activity history holding unit 105, the notifying spot determination unit 106, and the spot notification unit 107.

The spot list acquisition unit 108 acquires the spot list from the spot list generation device 110. That is, the spot list acquisition unit 108 receives the spot list transmitted by the spot list generation device 110.

The configurations of the current location acquisition unit 104, the activity history holding unit 105, the notifying spot determination unit 106, and the spot notification unit 107 are the same as in FIG. 3 so that a description thereof is omitted.

Thus, the program metadata acquisition unit 101, the viewing history acquisition unit 102, the spot list generation unit 103, the current location acquisition unit 104, the activity history holding unit 105, the notifying spot determination unit 106, and the spot notification unit 107 need not be located in one device.

The spot list generation device 110 may also include the program metadata acquisition unit 101, the viewing history acquisition unit 102, the spot list generation, unit 103, the activity history holding unit 105, and the notifying spot determination unit 106. The spot notification device 111 may also include only the current location acquisition unit 104 and the spot notification unit 107.

Figure 13:
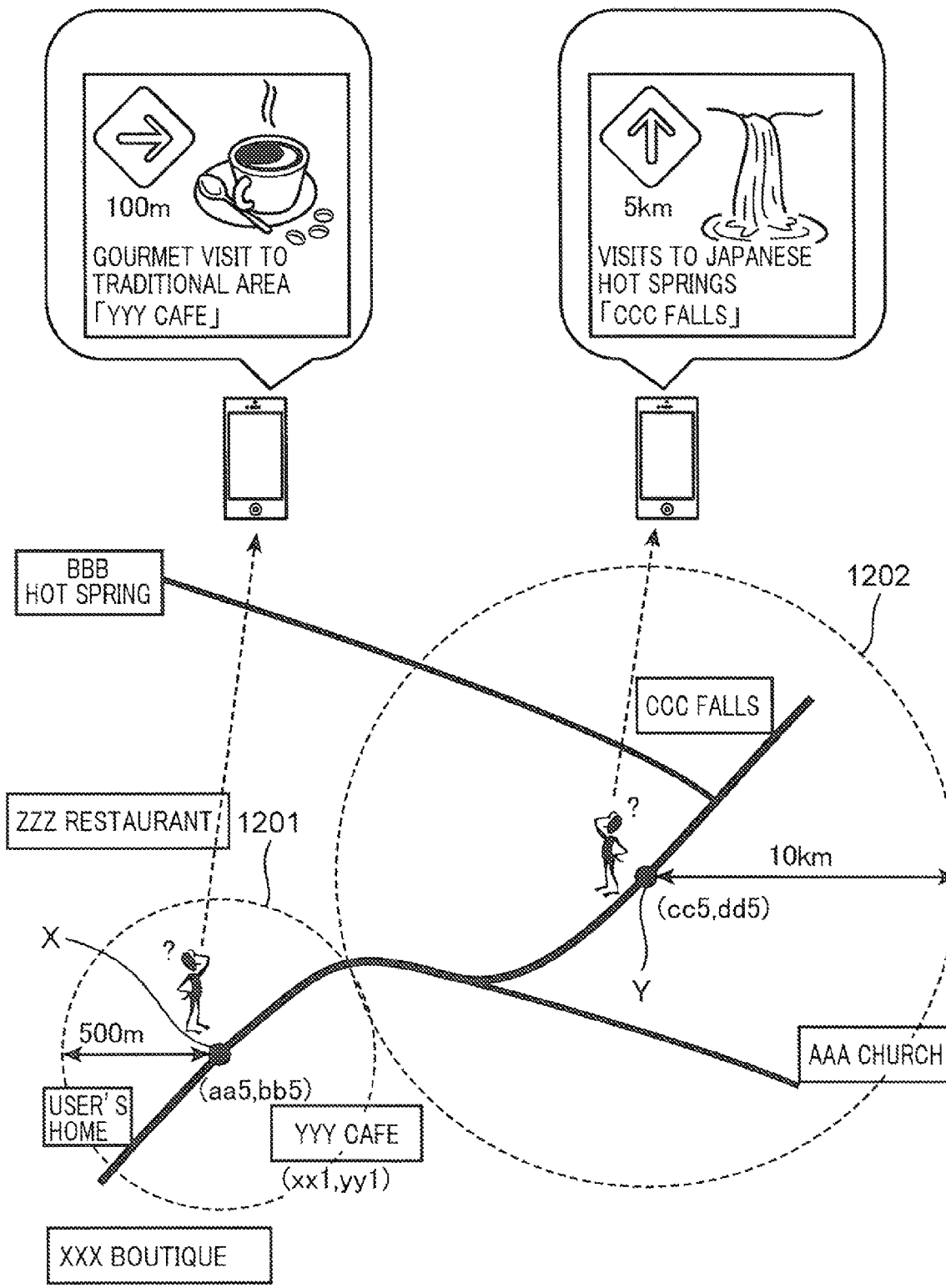
FIG. 13 is a schematic diagram for illustrating a flow up to the notification of a spot to the user using real data in Embodiment 1 of the present invention.

Here, a flow up to the notification of the spot to the user will be described using real data. FIG. 13 is a schematic diagram for illustrating the flow up to the notification of the spot to the user in Embodiment 1 of the present invention. First, the flow up to the generation of the spot list will be described using real data.

The program metadata server 201 holds the program metadata 31 shown in FIG. 4. The television 202 or the hard disk recorder 203 holds the program viewing history 41 shown in FIG. 5. The spot list generation unit 103 holds the spot list 51 shown in FIG. 6A as the spot list up to the previous day.

The spot list generation unit 103 acquires the program viewing history 41 from the viewing history acquisition unit 102. The program viewing history 41 may be acquired in advance by the viewing history acquisition unit 102 or may also be acquired by the viewing history acquisition unit 102 with the timing when the spot list generation unit 103 generates the spot list.

The spot list generation unit 103 acquires the program metadata related to the program listed in the program viewing history 41 from the program metadata acquisition unit 101. The program metadata acquisition unit 101 may preliminarily acquire the program metadata related to all the programs from the program metadata server 201 and output only the program metadata related to the program listed in the program viewing history 41 to the spot list generation unit 103. Alternatively, the program metadata acquisition unit 101 may also acquire only the program metadata related to the program listed in the program viewing history 41 with the timing on receiving a request to acquire the program metadata related to the program listed in the program viewing history 41 from the spot list generation unit 103 and output the acquired program metadata to the spot list generation unit 103.

The spot list generation unit 103 acquires program metadata 32 corresponding to the first program in the program viewing history 41. The program metadata 32 is the program metadata corresponding to the program having the program title "Gourmet Visit to Traditional Area" and the broadcast date/time "2013 Mar. 9 08:00-10:00". The spot list generation unit 103 enters "Program Title" in the program metadata 32 in "Program Title" in the spot list, enters "Broadcast Date/Time" in the program metadata 32 in "Broadcast Date/Time" in the spot list, enters "Spot Name" in the program metadata 32 in "Spot Name" in the spot list, enters "Spot Location" in the program metadata 32 in "Spot Location" in the spot list, and enters "Spot URL" in the program metadata 32 in "Spot URL" in the spot list. The spot list generation unit 103 performs the same operation for all the programs in the program viewing history 41.

In this manner, a spot list 52 is generated in which the spot information items associated with the program viewing history 41 have been added to the spot list 51.

Next, the flow up to the notification of information related to the spot to the user situated at the point X shown in FIG. 13 will be described using real data.

The notifying spot determination unit 106 acquires an activity history 61 (FIG. 7A) (Step S11 of FIG. 8). Then, the notifying spot determination unit 106 acquires user locational information (aa5, bb5) in a latest activity history 63 in the activity history 61 as the current location (Step S12 of FIG. 8).

Next, the notifying spot determination unit 106 sets the spot search range (Step S13 of FIG. 8).

At this time, the notifying spot determination unit 106 determines whether or not the current location is within the range of daily activities of the user (Step S31 of FIG. 10). Since the point X as the current location (aa5, bb5) is within the range of daily activities of the user, the notifying spot determination unit 106 sets the spot search range to the short distance (Step S32 of FIG. 10). Here, the notifying spot determination unit 106 refers to a value in the spot search range table 2401 (FIG. 9) corresponding to the short distance. Since the value corresponding to the short distance is 500 m, the notifying spot determination unit 106 sets the spot search range in a circle having a radius of 500 m around the current location.

Next, the notifying spot determination unit 106 acquires the spot list 52 (FIG. 6B) from the spot list generation unit 103 (Step S14 of FIG. 8).

Next, the notifying spot determination unit 106 enters 1 in the variable N (Step S15 of FIG. 8). Then, the notifying spot determination unit 106 acquires at first spot information item 53 (FIG. 6B) in the acquired spot list (Step S16 of FIG. 8).

Next, the notifying spot determination unit 106 determines whether or not the spot locational information (xx0, yy0) of the first spot information item 53 is included in the range in the circle having the radius of 500 m around the point X (aa5, bb5) as the current location (Step S17 of FIG. 8). That is, the notifying spot determination unit 106 determines whether or not "Tokyo Station" as the first spot is included in a short-distance spot search range 1201 in FIG. 13.

In this case, the notifying spot determination unit 106 determines that the first spot is not included in the spot search range 1201 and therefore increases the value of the variable N by 1 (Step S19 of FIG. 8).

Next, the notifying spot determination unit 106 determines whether or not there is a second spot information item in the acquired spot list. In this case, there is the second spot information item in the acquired spot list so that the notifying spot determination unit 106 acquires a second spot information item 54 (Step S16 of FIG. 8).

Then, the notifying spot determination unit 106 determines whether or not the spot locational information (xx1, yy1) of the second spot information item 54 is included in the range in the circle having the radius of 500 m around the point X (aa5, bb5) as the current location (Step S17 of FIG. 8). That is, the notifying spot determination unit 106 determines whether or not "YYY Cafe" as the second spot is included in the short-distance spot search range 1201 in FIG. 13.

In this case, the notifying spot determination unit 106 determines that the second spot is included in the spot search range 1201 and therefore gives an instruction to notify the user of the second spot information item (Step S18 of FIG. 8). Specifically, the spot notification unit 107 repots the presence of the spot to the user using the speaker 500 or the vibration device 600 or notifies the user of "Gourmet Visit to Traditional Area" as the program title or "YYY Cafe" as the spot name using the display device 400. Note that the spot notification unit 107 may also display, together with the program title or the spot name, a screen showing an image of the spot (YYY Cafe), information showing a direction from the current location to the spot (YYY Cafe), a website (website with the spot URL) having detailed information related to the spot, or a button for displaying the website having the detailed information related to the spot.

Then, the notifying spot determination unit 106 repeats the process described above for all the spot information items included in the spot list 52 and ends the notifying spot determination process.

Next, the flow up to the notification of the information related to the spot to the user situated at a point Y shown in FIG. 13 will be described using real data.

The notifying spot determination unit 106 acquires an activity history 62 (FIG. 7B) (Step S11 of FIG. 8). Then, the notifying spot determination unit 106 acquires the user locational information (cc5, dd5) of a latest activity history 64 in the activity history 62 as the current location (Step S12 of FIG. 8).

Next, the notifying spot determination unit 106 sets the spot search range (Step S13 of FIG. 8).

At this time, the notifying spot determination unit 106 determines whether or not the current location is within the range of daily activities of the user (Step S31 of FIG. 10). Since the point Y (cc5, dd5) as the current location is not within the range of daily activities of the user, the notifying spot determination unit 106 determines that the current location is not within the range of daily activities of the user. In this case, the notifying spot determination unit 106 searches for the user locational information in an activity history over a predetermined period (of, e.g., from a week before to the previous day). Since the user locational information is not present within a circle having a radius of 1 km around the current location (cc5, dd5), the notifying spot determination unit 106 determines that the current location Y (cc5, dd5) is not within the range of daily activities of the user.

Next, the notifying spot determination unit 106 determines whether or not the user has visited the current location (cc5, dd5) before (Step S33 of FIG. 10). In this case, the notifying spot determination unit 106 searches for the user locational information in an activity history up to the previous day. Since the user locational information is not present in the circle having the radius of 1 km around the current location (cc5, dd5), the notifying spot determination unit 106 determines that the user has not visited the current location before.

Next, the notifying spot determination unit 106 sets the spot search range to the long distance (Step S35 of FIG. 10). Here, the notifying spot determination unit 106 refers to a value corresponding to the long distance in the spot search range table 2401 (FIG. 9). Since the value corresponding to the long distance is 10 km, the notifying spot determination unit 106 sets the spot search range in a circle having a radius of 10 km around the current location.

Next, the notifying spot determination unit 106 acquires the spot list 52 (FIG. 6B) from the spot list generation unit 103 (Step S14 of FIG. 8).

Next, the notifying spot determination unit 106 enters 1 in the variable N (Step S15 of FIG. 8). Then, the notifying spot determination unit 106 acquires the first spot information item 53 (FIG. 6B) in the acquired spot list (Step S16 of FIG. 8).

Next, the notifying spot determination unit 106 determines whether or not the spot locational information (xx0, yy0) of the first spot information item 53 is included in the range in the circle having the radius of 10 km around the point Y (cc5, dd5) as the current location (Step S17 of FIG. 8). That is, the notifying spot determination unit 106 determines whether or not "Tokyo Station" as the first spot is included in a long-distance spot search range 1202 in FIG. 13.

In this case, the notifying spot determination unit 106 determines that the first spot is not included in the spot search range 1202 and therefore increases the value of the variable N by 1 (Step S19 of FIG. 8).

Then, the notifying spot determination unit 106 repeats the processing in Steps S16 to S20 in FIG. 8 to acquire a fifth spot information item 55 (Step S16 of FIG. 8).

Then, the notifying spot determination unit 106 determines whether or not the spot locational information (xx4, yy4) of the fifth spot information item 55 is included in the range in the circle having the radius of 10 km around the point Y (cc5, dd5) as the current location (Step S17 of FIG. 18). That is, the notifying spot determination unit 106 determines whether or not "CCC Falls" as a fifth spot is included in the long-distance spot search range 1202 in FIG. 13

In this case, the notifying, spot determination unit 106 determines that the fifth spot is included in the spot search range 1202 and therefore gives an instruction to notify the user of the fifth spot information item (Step S18 of FIG. 8). Specifically, the spot notification unit 107 notifies the user of the presence of the spot using the speaker 500 or the vibration device 600 or notifies the user of "Visits to Japanese Hot Springs" as the program title or "CCC Falls" as the spot name using the display device 400.

Then, the notifying spot determination unit 106 repeats the process described above for all the spot information items included in the spot list 52 and ends the notifying spot determination process.

Note that, in the long-distance spot search range 1202 in FIG. 13, "AAA Church" as a sixth spot is included. Accordingly, the notifying spot determination unit 106 gives an instruction to notify the user of the sixth spot information item. Specifically, the spot notification unit 107 notifies the user of the presence of the spot using the speaker 500 or the vibration device 600 or notifies the user of "Visits to Japanese Hot Springs" as the program title or "AAA Church" as the spot name using the display device 400.

Thus, in accordance with the activity history of the user, the range for searching for a spot is set. This allows information related to the spot introduced in the program viewed by the user to be notified the user when the user approaches the vicinity of the spot.

Figure 14:
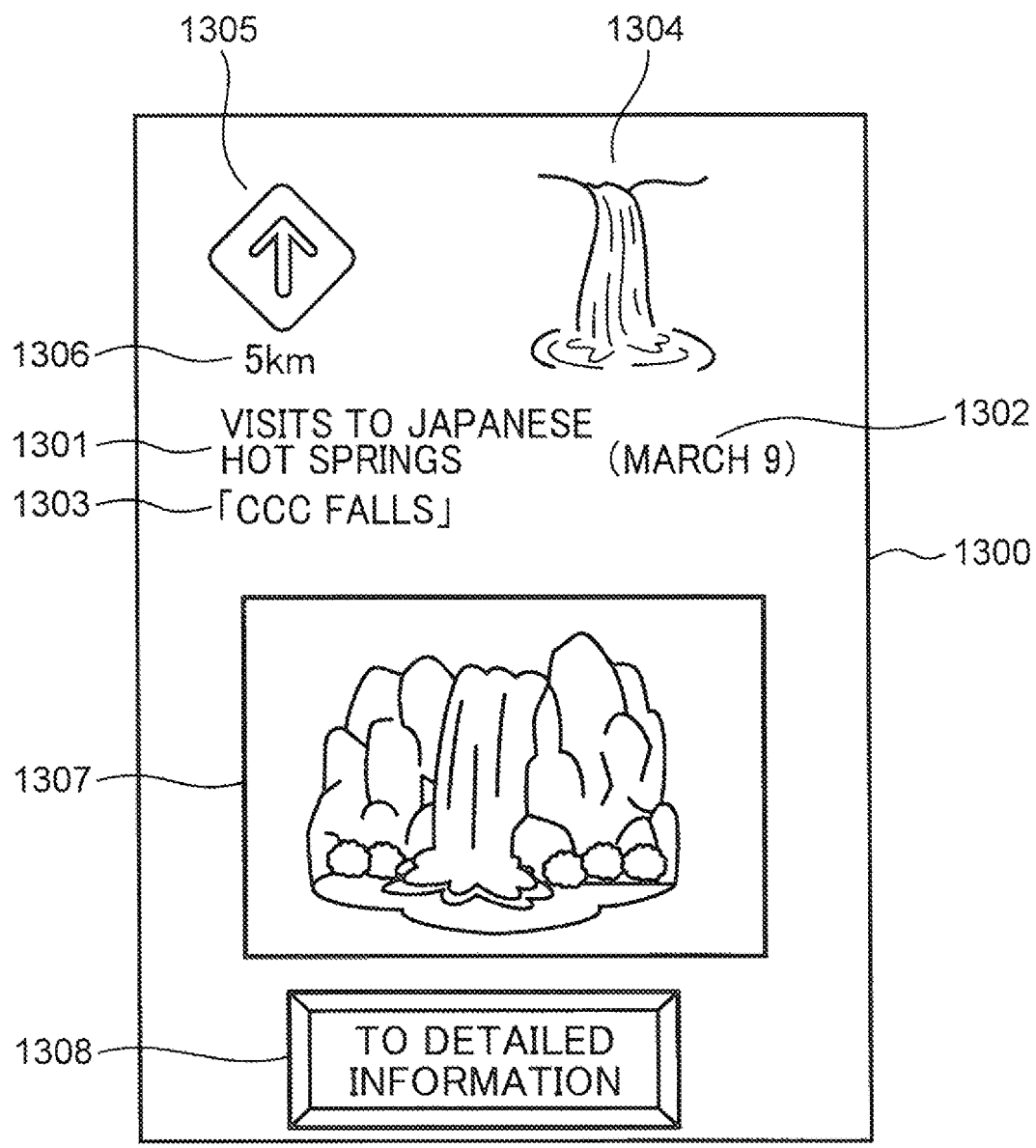
FIG. 14 is a view showing an example of a display screen for notifying spot information in Embodiment 1 of the present invention.

FIG. 14 is a view showing an example of a display screen for notifying spot information in Embodiment 1 of the present invention. The spot notification unit 107 notifies the user of the spot information using light emission, vibration, a voice/sound, an image, or the like. As the spot information shown using the display device 400, there can be considered information showing a program title, information showing a broadcast date/time, information showing a spot name, an image briefly showing the type or content of the spot, information showing the direction in which the spot exists, information showing the distance between the current location and the spot, an image showing the content of the spot, a moving image of the program that has introduced the spot, a still image of the program that has introduced the spot, the URL of a website having detailed information on the spot, a link button to the website having the detailed information on the spot, or the like.

For example, in FIG. 14, a display screen 1300 includes information 1301 showing the program title, information 1302 showing the broadcast date/time, information 1303 showing the spot name, an image 1304 briefly showing the type or content of the spot, information 1305 showing the direction in which the spot exists, information 1306 showing the distance between the current location and the spot, an image 1307 showing the content of the spot, and a link button 1308 to the website having detailed information on the spot.

Note that the information displayed on the display device 400 by the spot notification unit 107 is not limited thereto.

For example, the spot notification unit 107 may also display a map image of a map in which the current location and the spot are pointed on the display device 400. The spot notification unit 107 may also show the name of a public transportation facility to be used when the user moves from the current location to the spot. The spot notification unit 107 may also show the time table of the public transportation facility, a boarding station name, a destination station name, or a route from the current location to a boarding station.

The spot notification unit 107 may also notify the user of the spot information using not the display device 400, but a voice/sound or light emission.

Embodiment 2

Embodiment 2 relates to a spot notification method using the activity history of a user as a spot notification determination condition.

A spot notification system in Embodiment 2 has the same overall configuration as that of the spot notification system in Embodiment 1 shown in FIG. 2 so that a description thereof is omitted.

Figure 15:
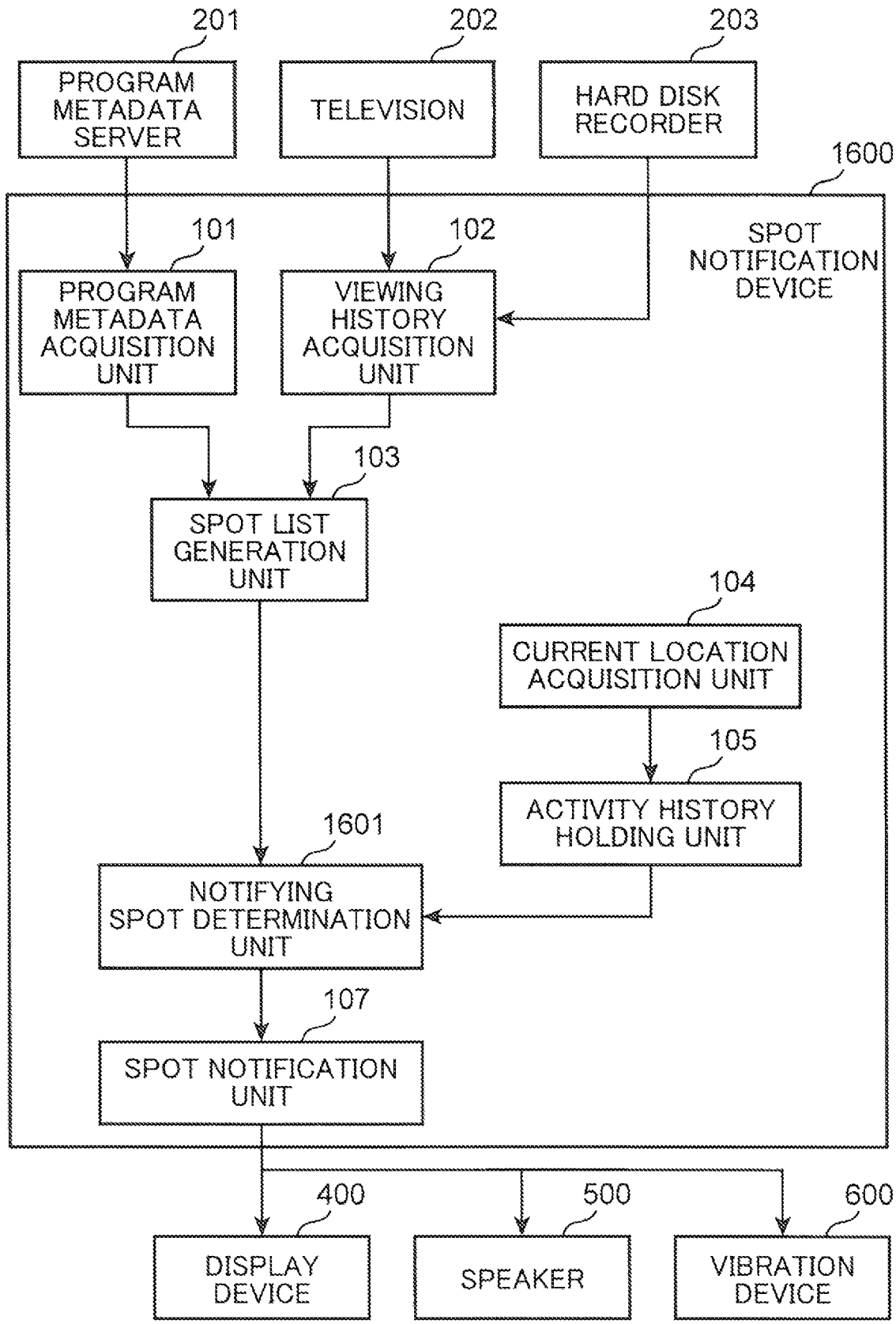
FIG. 15 is a view showing an example of a configuration of a spot notification device in Embodiment 2 of the present invention.

FIG. 15 is a view showing an example of a configuration of a spot notification device in Embodiment 2 of the present invention. A spot notification device 1600 includes the program metadata acquisition unit 101, the viewing history acquisition unit 102, the spot list generation unit 103, the current location acquisition unit 104, the activity history holding unit 105, a notifying spot determination unit 1601, and the spot notification unit 107.

The spot notification device 1600 may also include the display device 400, the speaker 500, and the vibration device 600 as an output unit which notifies a user of a spot. The spot notification device 1600 need not include any of the display device 400, the speaker 500, and the vibration device 600. Alternatively, the spot notification device 1600 may also include at least one of the display device 400, the speaker 500, and the vibration device 600.

The program metadata acquisition unit 101, the viewing history acquisition unit 102, the spot list generation unit 103, the current location acquisition unit 104, the activity history holding unit 105, and the spot notification unit 107 in Embodiment 2 have the same configurations as those in Embodiment 1 so that a description thereof is omitted.

FIG. 16 is a view showing an example of program metadata held in a program metadata server in Embodiment 2 of the present invention. Unlike in Embodiment 1, program metadata 1401 includes a program title, a broadcast date/time, a spot name, a spot location, and detailed spot information items. The detailed spot information items include the opening hours of the spot, optimum visiting time for the spot, and a spot type.

The program title, the broadcast date/time, the spot location, and the spot URL are the same as the individual information items in Embodiment 1 so that a description thereof is omitted.

The opening hours is information showing the hours during which the spot is open. Even if the user is situated near the spot, when the current time is out of the opening hours of the spot, it is desirable not to notify the user of the spot information. By including the opening hours of the spot, the program metadata 1401 allows a more proper spot to be notified.

The optimum visiting time is information showing the optimum visiting time within the opening hours of the spot. For example, when "ZZZ Restaurant" is introduced as a lunch buffet place with high cost performance in the program, the user is expected to visit "ZZZ Restaurant" during lunchtime, not during dinnertime. Accordingly, it is desired to notify the user of the spot during lunch time rather than during dinner time. By including the optimum visiting time, the program metadata 1401 allows a more proper spot to be notified. Note that the optimum visiting time is hours set in advance as optimum hours for a visit to the spot.

The spot type is information showing the category to which the spot belongs. For example, it is desirable not to notify the user who has already had lunch of a spot associated with dining That is, spot information the spot type of which is dining is notified the user of only during the hours of 11 o'clock to 13 o'clock as lunch hours. The notification of the spot information is refrained during the other hours. When the user stayed at a certain location for 30 minutes or more during a predetermined period immediately before, it may be possible that the user had a meal. Accordingly, the notification of the spot information the spot type of which is dining is refrained. It is also desirable not to notify the user of spot information associated with shopping to, e.g., a user who is moving fast. That is, the spot information the spot type of which is shopping is notified only when the moving speed is not more than a given speed. By including the spot type, the program metadata 1401 allows a more proper spot to be notified.

The opening hours, the optimum visiting time, and the spot type are an example of the detailed spot information items for notifying more proper spot information. The detailed spot information items included in the program metadata 1401 are not limited to such information items.

In Embodiment 2, the program viewing history acquired from a television or a hard disk recorder is the same as the program viewing history in Embodiment 1 shown in FIG. 5 so that a description thereof is omitted.

FIG. 17 is a view showing an example of a spot list generated on the basis of the program metadata and the program viewing history in Embodiment 2. A spot list 1501 includes the program title, the broadcast date/time, the spot name, the spot location, the spot URL, the opening hours, the optimum visiting time, and the spot type.

The individual information items of the program title, the broadcast date/time, the spot name, the spot location, the spot URL, the opening hours, the optimum visiting time, and the spot type are the same as the individual information items of the program metadata 1401 shown in FIG. 16 so that a description thereof is omitted.

The activity history in Embodiment 2 is the same as the activity history in Embodiment 1 shown in FIGS. 7A and 7B so that a description thereof is omitted.

The notifying spot determination unit 1601 acquires a spot list from the spot list generation unit 103 at regular time intervals or with timing which satisfies a preliminarily specified condition and also acquires an activity history from the activity history holding unit 105 to search for the spot to be notified the user in the spot list on the basis of a search range set in accordance with the activity history. When there is the spot to be notified the user, the notifying spot determination unit 106 gives an instruction to notify the user of the spot to the spot notification unit 107.

FIG. 18 is a view showing an example of a spot search range determination table in Embodiment 2. A spot search range determination table 1701 includes information items related to a short-distance spot search range, a middle-distance spot search range, and a long-distance spot search range versus each of the spot types. The spot search ranges are categorized into the short distance, the middle distance, and the long distance. To each of the spot search ranges, a value in accordance with the spot type is set. In Embodiment 1, each of the short-distance spot search range, the middle-distance spot search range, and the long-distance spot search range has the same value irrespective of the spot type. By contrast, in Embodiment 2, each of the values of the short-distance spot search range, the middle-distance spot search range, and the long-distance spot search range can be set in accordance with each of the spot types.

FIG. 19 is a view showing an example of a spot notification determination table in Embodiment 2. A spot notification determination table 1801 includes notification conditions, notification timing, and a notification method versus each of the spot types.

The notification conditions are conditions serving as a basis for determining whether or not a spot is to be notified. In Embodiment 2, the notification conditions include a current time, a moving speed, a 1-hour movement range, and the presence/absence of a stay of 30 minutes or more. However, the present invention is not limited thereto.

In the current time as the notification condition, a real time within the opening hours or during the optimum visiting time or a real time set in advance for the spot is entered. When the current time as the notification condition in the spot notification determination table 1801 is set in the opening hours, the notifying spot determination unit 1601 determines that the notification condition is satisfied. By including a condition for determining whether or not the current time is within the opening hours or a condition for determining whether or not the current time is during the optimum visiting time, the notification conditions allow the spot to be notified only at a more proper time.

In the moving speed as the notification condition, a condition related to the moving speed of the user (spot notification device 1600) is entered. When the moving speed as the notification condition in the spot notification determination table 1801 is set to a value of not more than 5 km/h, if the moving speed of the user is not more than 5 km per hour, the notifying spot determination unit 1601 determines that the notification condition is satisfied. It is possible to estimate, from the moving speed, the state of the user such as, e.g., whether the user is moving on a train or in a car or whether the user is walking fast or slowly. By thus including the moving speed, the notification conditions allow a spot more perfectly matching the current state of the user to be retrieved by the search and notified.

Note that the spot notification device 1600 may also include a moving speed measurement unit which measures the moving speed, though not shown. The notifying spot determination unit 1601 may also calculate a movement distance for the past one hour included in the activity history to calculate the moving speed.

In the 1-hour movement range as the notification condition, a value showing a range within which the locations reached by the user who had moved for the last one hour are distributed. In the case where the 1-hour movement range as the notification condition in the spot notification determination table 1801 is set to a 3 km or less, when the user locational information for the last one hour fails within a circle having a diameter of 3 km, the notifying spot determination unit 1601 determines that the notification condition is satisfied. It is possible to estimate, from the 1-hour movement range, the state of the user such as, e.g., whether or not the user is moving toward a destination or whether or not the user is aimlessly moving. By thus including the 1-hour movement range, the notification conditions allow a spot more perfectly matching the current state of the user to be retrieved by the search and notified.

In the presence/absence of a stay of 30 minutes or more as the determination condition, a value showing whether or not the user stayed at a certain location for 30 minutes or more during the last predetermined period is entered. Whether or not the user stayed for 30 minutes or more can be determined on the basis of, e.g., whether or not the locations reached by the user who had moved for 30 minutes are distributed within a predetermined range (of, e.g., a radius of 100 m or less). In the case where the presence/absence of a stay of 30 minutes or more as the notification condition in the spot notification determination table 1801 is set to "Absent", when the user did not stay at one location for 30 minutes or more during the last predetermined period, the notifying spot determination unit 1601 determines that the notification condition is satisfied. It is possible to estimate, from the presence/absence of a stay of 30 minutes or more, that, e.g., the user stayed at a certain place for eating and drinking, shopping, sightseeing, or the like. For example, it is possible to estimate that the user who stayed at a predetermined place for 30 minutes or more around twelve noon stayed there for 30 minutes or more for lunch at a restaurant or the like. Accordingly, it is desirable not to notify the user who had lunch for a given period of time of a spot the spot type of which is dining or cafe. By including the presence/absence of a stay of 30 minutes or more the notification conditions allow a spot more perfectly matching the current state of the user to be retrieved by the search and notified.

When the user stayed at the predetermined location for 30 minutes or more, by acquiring information on a facility or shop present at the location where the user stayed from the locational information on the location where the user stayed, it is possible to estimate the purpose of the user's stay such as e.g., whether or not the user stayed for eating or drinking, whether or not the user stayed for shopping, or whether or not the user stayed for sightseeing. For example, it is desirable to notify the user who is doing sightseeing of a scenic spot or a spot gaining people's attention. It is also desirable not to notify the user who had lunch of a spot the spot type of which is dining or cafe for a given period of time.

The notification conditions may also include the "Presence/absence of a stay of 30 minutes or more at a spot the spot type of which is dining", "Presence/absence of a stay of 30 minutes or more at a spot the spot type of which is a scenic spot", or the like, though not shown in FIG. 19. In that case, when the user stayed at a spot the spot type of which is dining or at a spot the spot type of which is a scenic spot for 30 minutes or more, the notifying spot determination unit 1601 acquires the spot type of the spot present at the location where the user has stayed.

In the present embodiment, "Presence/absence of a stay of 30 minutes or more" is used as the notification condition. However, the staying time is not limited to "30 minutes".

The spot notification determination table 1801 may also have a plurality of combinations of the plurality of notification conditions, the notification timing, and the notification method for each of the spot types. Note that, in the spot notification determination table 1801 shown in FIG. 19, the space filled with "-" means that there is no notification condition.

The notifying spot determination unit 1601 refers to the spot notification determination table 1801 (notification determination table) in which the types of the spots are associated with the notification conditions for determining whether or not a spot is to be notified and searches for a spot which satisfies the notification conditions corresponding to the type of the spot. The notification conditions may also include a condition such that the current time is within the opening hours of the spot or the current time is within the optimum hours for visiting the spot.

The spot notification device 1600 may also further include a moving speed acquisition unit which acquires the moving speed of the user. In this case, the notification conditions may also include a condition such that the acquired moving speed of the user is not more than a walking speed. The spot notification device 1600 may also further include an activity amount acquisition unit which acquires an amount of activity of the user. In this case, the notifying spot determination unit 1601 may also determine the timing of notifying the spot in accordance with the acquired amount of activity of the user. Note that the amount of activity includes, e.g., consumed calories, the number of user's steps, a walking distance, a walking time, an amount of fat combustion, or the like.

Note that, in Embodiment 2, the notifying spot determination unit 1601 determines that the notification conditions are satisfied when each of the notification conditions of the current time, the moving speed, the 1-hour movement range, and the presence/absence of a staying time of 30 minutes or more is satisfied.

For example, when, with regard to a spot the spot type of which is "Cafe", the current time is within the opening hours of the spot, the moving speed of the user is not more than 5 km/h, the 1-hour movement range falls within the range in a circle having a radius of 3 km from the current location, and the user did not stayed at one location for 30 minutes or more, the notifying spot determination unit 1601 determines that the spot notification conditions are satisfied. When it is determined that the spot notification conditions are satisfied, the notification timing is set to "Immediately" and the notification method is set to "Light Emission (Green)+Vibration+Voice/Sound".

When, with regard to the spot the spot type of which is "Cafe", the current time is within the opening hours of the spot and the moving speed of the user is not more than 5 km/h also, the notifying spot determination unit 1601 determines that the spot notification conditions are satisfied. When it is determined that the spot notification conditions are satisfied, the notification timing is set to "Immediately" and the notification method is set to "Light Emission (Green)".

The notification timing is information related to the timing of notifying a spot. When the notification timing is "Immediately", the notifying spot determination unit 1601 immediately notifies the user of the spot. When the notification timing is "Not More than Activity Amount x", the notifying spot determination unit 1601 notifies the user of the spot with the timing when the activity amount of the user becomes not more than x. In this manner, the spot information can be notified with timing which is convenient for the user to view the spot information such as the timing when the user stops walking or is on a train.

The notification method is information related to a method of notifying a spot. The "Light Emission (Green)" and "Light Emission (Red)" as the notification method shows that the screen of the display device 400 or the light, emitting unit of the spot notification device 1600 is caused to emit green or red light. By changing the color on the light emitting unit in accordance with the type of the spot, the degree of emergency of notification, or the degree of importance of notification, the user can recognize the type of the spot, the degree of emergency of notification, and the degree of importance of notification without viewing the display device 400. By recognizing the color on the light emitting unit, the user can also determine whether or not to view the spot information displayed on the display device 400.

"Vibration" as the notification method, shows that the vibration device 600 is used to vibrate the spot notification device 1600.

"Voice/Sound" as the notification method shows that a voice/sound is output from the spot notification device using the speaker 500. In Embodiment 2, the content of the voice/sound may also be specified. For example, the spot notification unit 107 may also change the content of the voice/sound used for notifying in accordance with the type of the spot, the degree of emergency of notification, or the degree of importance of notification.

It may also be possible to change the combination of "Light Emission", "Vibration", and "Voice/Sound" each as the notification method in accordance with the type of a spot, the degree of emergency of notification, or the degree of importance of notification. This allows the user to recognize the type of a spot, the degree of emergency of notification, or the degree of importance of notification without viewing the spot information displayed on the display device 400 and determine whether or not to view the spot information displayed on the display device 400.

Figure 20:
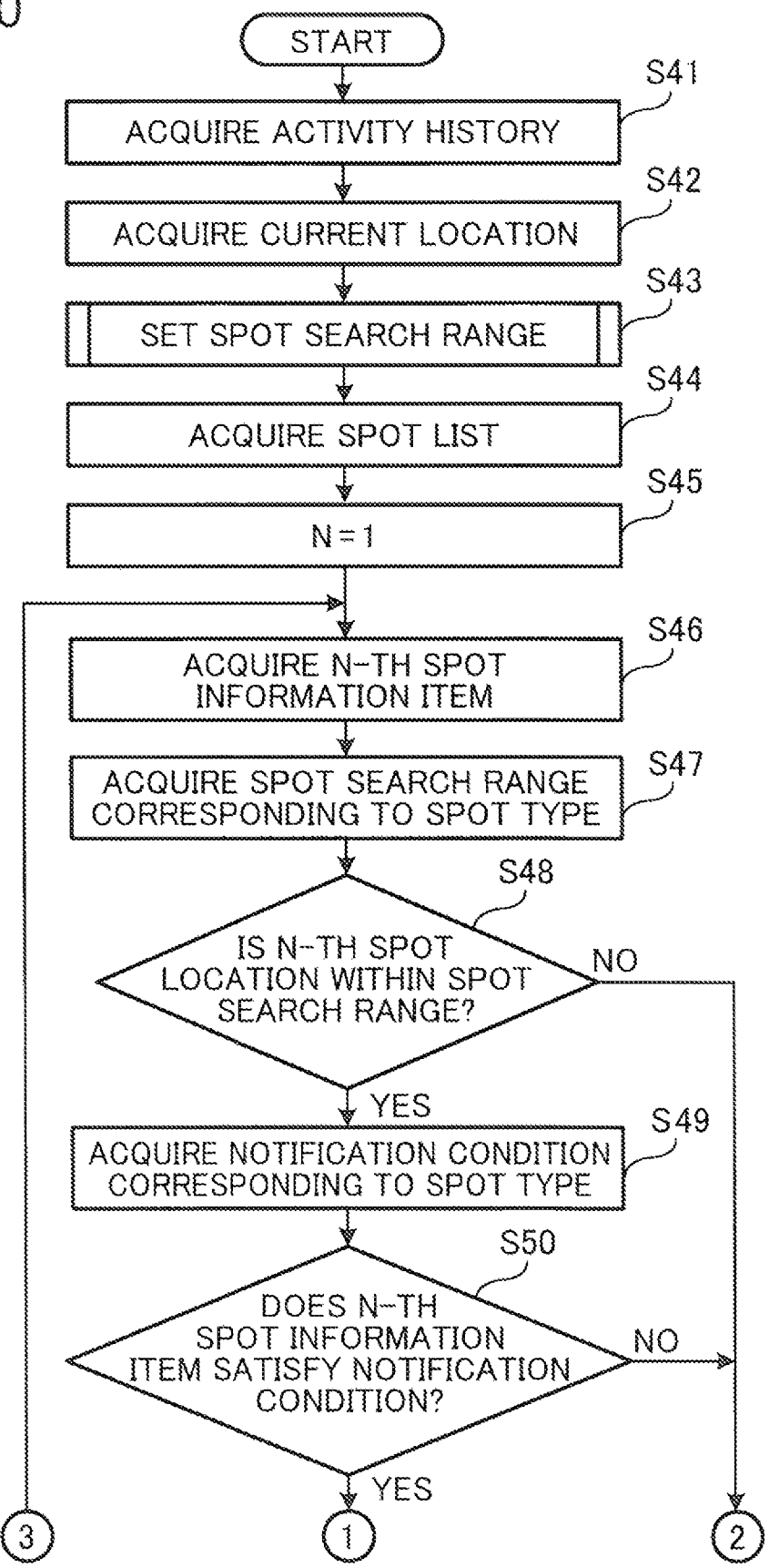
FIG. 20 is a first flow chart showing an example of processing in a notification spot determination unit in Embodiment 2.
Figure 21:
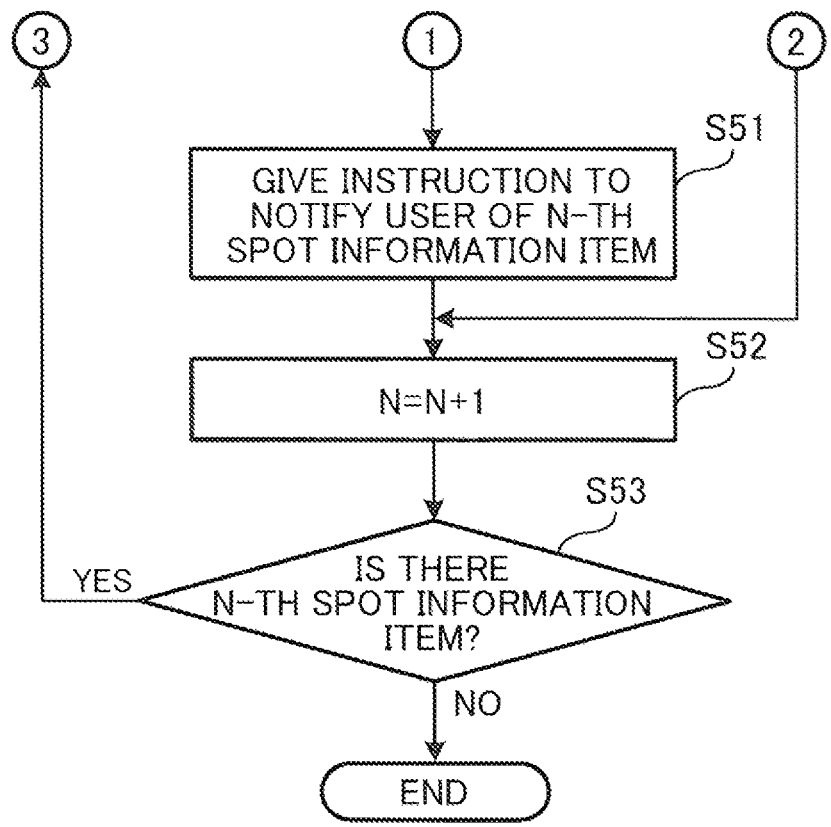
FIG. 21 is a second flow chart showing the example of the processing in the notification spot determination unit in Embodiment 2.

FIG. 20 is a first flow chart showing an example of processing in the notifying spot determination unit 1601 in Embodiment 2. FIG. 21 is a second flow chart showing an example of the processing in the notifying spot determination unit 1601 in Embodiment 2. Each of the flow charts shown in FIGS. 20 and 21 shows an example of a procedure in which the notifying spot determination unit 1601 acquires the spot list and the activity history, searches for the spot to be notified the user, and finally gives an instruction to notify the user of the spot.

In FIG. 20, processing in Steps S41 to S46 and processing in Steps S52 and S53 is the same as the processing in Steps S11 to S16 and the processing in Steps S19 and S20 in Embodiment 1. Accordingly, a description thereof is omitted and a description will be given only of processing in Steps S47 to S51.

When N-th spot information item is acquired in Step S46, the notifying spot determination unit 106 acquires the spot search range corresponding to the spot type on the basis of the spot type included in the spot information, the spot search range set in Step S43, and the spot search range determination table (Step S47).

Next, the notifying spot determination unit 106 determines whether or not the spot location included in the N-th spot information item is within the acquired spot search range (Step S48).

On determining that the spot location included in the N-th spot information item is within the spot search range (YES in Step S48), the notifying spot determination unit 106 acquires the notification conditions corresponding to the spot type from the spot notification determination table (Step S49).

Next, the notifying spot determination unit 106 determines whether or not the N-th spot information item satisfies the notification conditions (Step S50). That is, the notifying spot determination unit 106 acquires the notification conditions corresponding to the spot type included in the N-th spot information item and determines whether or not the N-th spot information item satisfies the acquired notification conditions.

On determining that the N-th spot information item satisfies the notification conditions (YES in Step S50), the notifying spot determination unit 106 gives an instruction to notify the user of the N-th spot information item using the notification timing and the notification method each corresponding to the spot type (Step S51). Note that the notifying spot determination unit 106 acquires the notification timing and the notification method each corresponding to the spot type from the spot notification determination table.

On the other hand, on determining that the spot location included in the N-th spot information item is not within the spot search range (NO in Step S48), on determining that the N-th spot information item does not satisfy the notification conditions (NO in Step S50), or when the processing in Step S51 is ended, the notifying spot determination unit 106 moves to the processing in Step S52.

The procedure of the spot search range determination process in Embodiment 2 is the same as the procedure of the spot search range determination process in Embodiment 1 shown in FIG. 10 so that a description thereof is omitted.

By thus using notification conditions such as the moving speed of the user calculated from the activity history of the user, the 1-hour movement range of the user, and whether or not the user stays at the same place for 30 minutes or more, it is possible to search for a spot matching the current state of the user and determine notification timing matching the current state of the user and a notification method matching the current state of the user.

Embodiment 3

Embodiment 3 relates to a spot notification method which changes a spot search range or a method of notifying of a spot in accordance with the situation in which the user viewed the program.

The overall configuration of the spot notification system in Embodiment 3 is the same as the overall configuration of the spot notification system in Embodiment 1 shown in FIG. 2 so that a description thereof is omitted.

Figure 22:
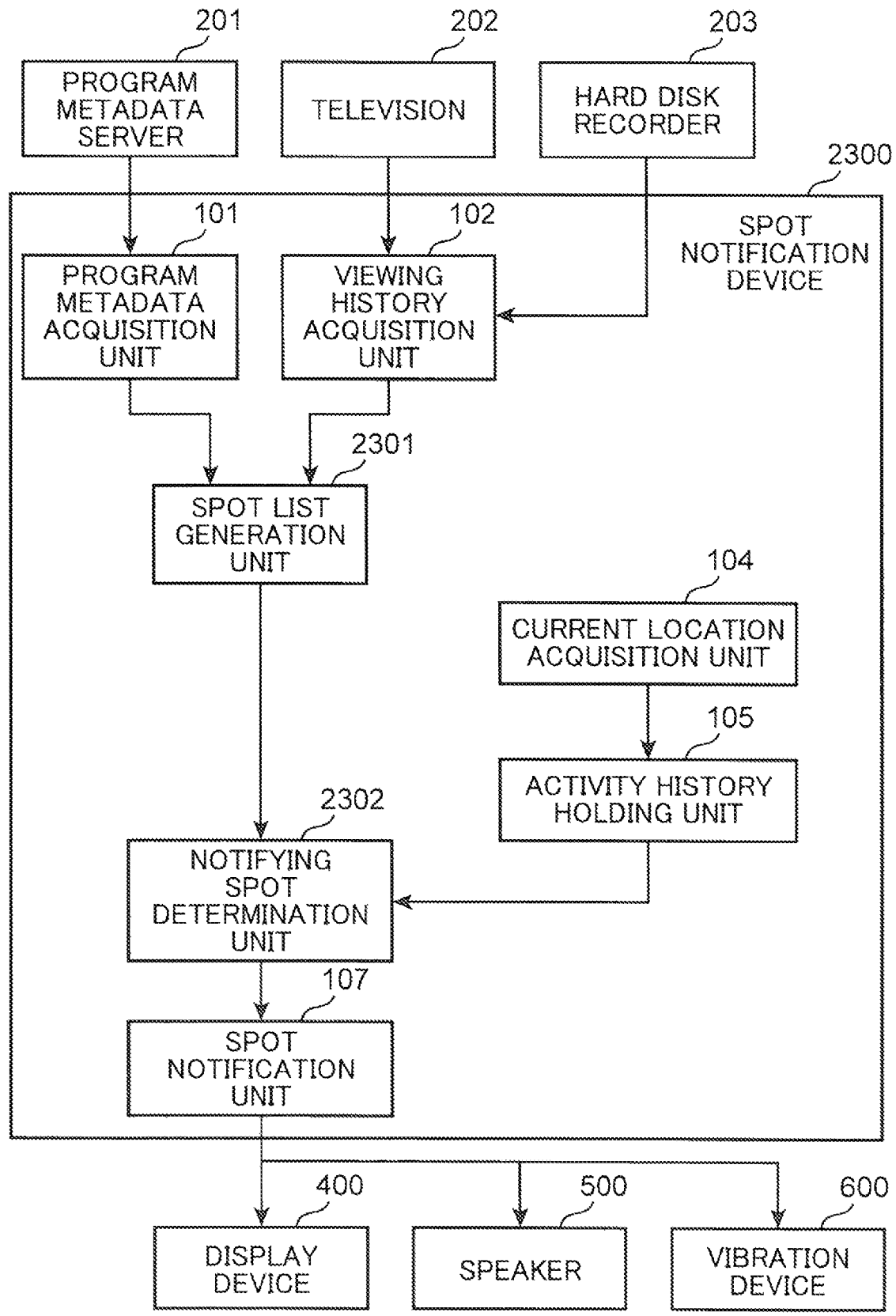
FIG. 22 is a view showing an example of a configuration of a spot notification device in Embodiment 3 of the present invention.

FIG. 22 is a view showing an example of a configuration of a spot notification device in Embodiment 3 of the present invention. A spot notification device 2300 includes the program metadata acquisition unit 101, the viewing history acquisition unit 102, a spot list generation unit 2301, the current location acquisition unit 104, the activity history holding unit 105, a notifying spot determination unit 2302, and the spot notification unit 107.

The spot notification device 2300 may also include the display device 400, the speaker 500, and the vibration device 600 each as an output unit which notifies a user of a spot. The spot notification device 2300 need not include any of the display device 400, the speaker 500, and the vibration device 600. Alternatively, the spot notification device 2300 may also include at least one of the display device 400, the speaker 500, and the vibration device 600.

The program metadata acquisition unit 101, the viewing history acquisition unit 102, the current location acquisition unit 104, the activity history holding unit 105, and the spot notification unit 107 in Embodiment 3 have the same configurations as those in Embodiment 1 so that a description thereof is omitted.

The spot list generation unit 2301 acquires the program viewing history of a user from the viewing history acquisition unit 102 at regular time intervals or with timing which satisfies a preliminarily specified condition and acquires program metadata corresponding to the program viewed by the user from the program metadata server 201. Then, the spot list generation unit 2301 produces a spot list in which information items related to the spot introduced in the section of the program viewed by the user are listed. At this time, the spot list generation unit 2301 adds the degree of interest of the user in the spot to the spot information items on the basis of the situation in which the user viewed the program.

For example, for the section in which the program recorded in the hard disk recorder 203 was reproduced at a normal speed, the degree of interest is set to "Middle". For the section in which the program recorded in the hard disk recorder 203 was reproduced at a normal speed multiple times, the degree of interest is set to "High". For the section in which the program recorded in the hard disk recorder 203 was reproduced at a double speed, the degree of interest is set to "Low".

The spot list generation unit 2301 adds a newly generated spot list to the previously generated spot list. For example, when there is the spot list generated for the program viewing history up to the previous day and the new spot list is generated today, the spot list generation unit 2301 holds the latest spot list in which the spot list generated today has been added to the spot list up to the previous day.

In Embodiment 3, it is assumed that the types of the viewing situation include "Normally Reproduced", "Reproduced at Double Speed", "Unviewed", or "Reproduced Multiple Times". However, the present invention is not limited thereto.

For example, the types of the viewing situation may also include "Temporarily Stopped" and, for the section in which the program recorded on the hard disk recorder 203 was temporarily stopped, the degree of interest may also be set to "High".

FIG. 23 is a view showing an example of the program metadata held in the program metadata server in Embodiment 3 of the present invention. Unlike in Embodiment 1, program metadata 2000 includes a program title, a broadcast date/time, a spot name, a spot location, and a spot broadcast time.

The program title, the broadcast date/time, the spot name, the spot location, and the spot URL are the same as in the individual information items in Embodiment 1 so that a description thereof is omitted.

The spot broadcast time is the time when an image for introducing a spot was broadcast in the program.

FIG. 24 is a view showing an example of the program viewing history acquired from a television or the hard disk recorder in Embodiment 3. The program viewing history includes the program title, the broadcast date/time, and the viewing situation.

The program title and the broadcast date/time in Embodiment 3 are the same as in Embodiment 1 so that a description thereof is omitted.

The viewing situation shows how the user viewed the program recorded on the hard disk recorder 203 (recording device). The viewing situation is represented by a viewing operation performed by the user on the program specified by the program title and the broadcast date/time, such as reproduction, fast-forward, fast-rewind, or skip. For example, when the program titled "Gourmet Visit to Traditional Area" recorded on the hard disk recorder 203 was normally reproduced from the beginning, reproduced at a double speed at a point where 15 minutes had elapsed from the beginning, and stopped at a point where 20 minutes had elapsed from the beginning, it follows that the part of the program between 08:00 and 08:15 was viewed once by normal reproduction, the part of the program between 08:15 and 08:20 was viewed once by double-speed reproduction, and the part of the program between 08:20 and 10:00 was not viewed (unviewed).

Likewise, for example, when the program titled "Visits to Japanese Hot Springs" recorded on the hard disk recorder 203 was normally reproduced from the beginning, rewound at a point where 20 minutes had elapsed from the beginning to a point where 15 minutes had elapsed from the beginning, and reproduced again to the point where 20 minutes had elapsed from the beginning, it follows that the part of the program between 10:00 and 10:15 was normally reproduced once, the part of the program between 10:15 and 10:20 was normally reproduced multiple times (twice), and the part of the program between 10:20 and 12:00 was not viewed (unviewed).

Thus, the viewing situation includes the section in which the spot was introduced in the program, and a viewing operation performed by the user in that section. The viewing operation represents the viewing situation categorized into any of a plurality of types such as "Normally Reproduced", "Reproduced at Double Speed", "Reproduced Multiple Times", and "Unviewed".

Note that, when the program is viewed on the television 202, an operation such as fast-forward or fast-rewind cannot be performed so that the viewing operations are only "Normally Reproduced" and "Unviewed".

When only a part of the program was viewed, it is desirable not to notify the user of the spot introduced in the unviewed part thereof. Since the program metadata includes the spot broadcast time in the program and the program viewing history includes the situation in which the user viewed the program, it is possible to more properly notify the user of the spot.

A notifying spot determination unit 2302 sets the spot search range in accordance with the viewing situation.

The viewing situation includes a first viewing situation in which the program recorded on the hard disk recorder 203 (recording device) was reproduced in fast-forward, a second viewing situation in which the program recorded on the hard disk recorder 203 (recording device) was reproduced at a normal speed, and a third viewing situation in which the program recorded on the hard disk recorder 203 (recording device) was reproduced at a normal speed multiple times. The spot search range includes a first spot search range having a first radial distance, a second spot search range having a second radial distance longer than the first radial distance, and a third spot search range having a third radial distance longer than the second radial distance. When the program recorded on the hard disk recorder 203 (recording device) was viewed in the first viewing situation, the notifying spot determination unit 2302 sets the spot search range to the first spot search range. When the program recorded on the hard disk recorder 203 (recording device) was viewed in the second viewing situation, the notifying spot determination unit 2302 sets the spot search range to the second spot search range. When the program recorded on the hard disk recorder 203 (recording device) was viewed in the third viewing situation, the notifying spot determination unit 2302 sets the spot search range to the third spot search range.

FIG. 25 is a view showing an example of the spot list generated on the basis of the program metadata and the program viewing history in Embodiment 3. A spot list 2200 includes a program title, a broadcast date/time, a spot name, a spot location, a spot URL, and the degree of interest.

The individual information items of the program title, the broadcast date/time, the spot location, and the spot URL are the same as the individual information items of the program metadata 1401 shown in FIG. 16 so that a description thereof is omitted.

The degree of interest shows how much interest the user has in the spot. The degree of interest is categorized into three types which are "Low", "Middle", and "High" depending on the degree of interest of the user in the spot introduced in the program. The degree of interest is determined in accordance with the viewing situation of the user.

Note that an activity history in Embodiment 3 is the same as the activity history in Embodiment 1 shown in FIGS. 7A and 7B so that a description thereof is omitted.

Figure 26:
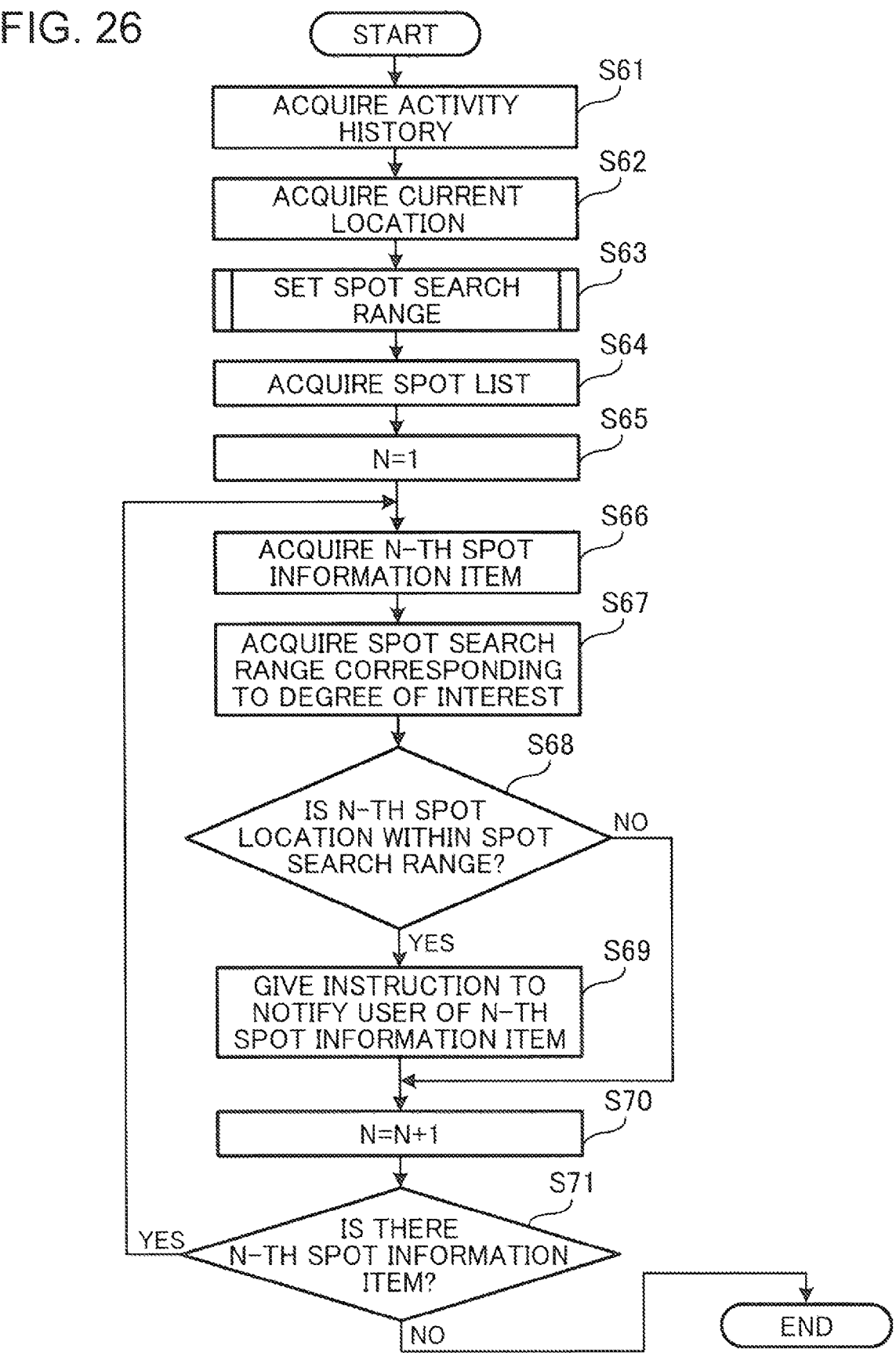
FIG. 26 is a flow chart showing an example of processing in a notification spot determination unit in Embodiment 3.

FIG. 26 is a flow chart showing an example of processing in the notifying spot determination unit 2302 in Embodiment 3. The flow chart shown in FIG. 20 shows an example of a procedure in which the notifying spot determination unit 2302 acquires the spot list and the activity history, searches for the spot to be notified the user, and finally gives an instruction to notify the user of the spot.

In FIG. 26, processing in Steps S61 to S66 and processing in Steps S69 to S71 is the same as the processing in Steps S11 to S16 and the processing in Steps S18 to S20 in Embodiment 1. Accordingly, a description thereof is omitted and a description will be given only of processing in Steps S67 and S68.

Also, the procedure of the spot search range determination process in Embodiment 3 is the same as the procedure of the spot search range determination process in Embodiment 1 shown in FIG. 10 so that a description thereof is omitted. In the same manner as in Embodiment 1, the procedure of the spot search range determination process in Embodiment 3 is not limited to the flow chart shown in FIG. 10.

When an N-th spot information item is acquired in Step S66, on the basis of the degree of interest included in the spot information item, the spot search range set in Step S63, and the spot search range determination table, the notifying spot determination unit 2302 acquires a spot search range corresponding to the degree of interest (Step S67).

Unlike in Embodiment 1, in Embodiment 3, the spot information item has the degree of interest. The notifying spot determination unit 2302 uses the degree of interest to widen the spot search range for a spot which receives a high degree of interest and narrow the spot search range for a spot which receives a low degree of interest. The spot notification unit 107 may also use the degree of interest to change a notification method such that a spot notification is more noticeable by the user.

Specifically, in Embodiment 1, as shown in FIG. 9, for each category of the spot search range, i.e., "short distance", "middle distance", or "long distance", one radial distance is determined in advance. However, in Embodiment 3, when the degree of interest is high, the notifying spot determination unit 2302 may also multiply the radial distance by 1.5. When the degree of interest is low, the notifying spot determination unit 2302 may also multiply the radial distance by 0.8. That is, the notifying spot determination unit 2302 multiplies the radial distance by a factor set in advance in accordance with the degree of interest to thus set the spot search range in accordance with the degree of interest. Note that the factor increases as the degree of interest increases.

As shown in FIG. 27, the notifying spot determination unit 2302 may also set the radial distance of the spot search range for each of the degrees of interest.

FIG. 27 is a view showing an example of the spot search range table in Embodiment 3. In Embodiment 3, a spot search range table 2402 is the table for specifying, when the spot search range is set to any of the short distance, the middle distance, and the long distance, the radial distance from the current location corresponding to the category of the set short distance, middle distance, or long distance and the degree of interest in the spot. The spot search range table 2402 is held in advance in the notifying spot determination unit 2302.

For example, when the spot search range is set to the short distance in Step S63 and the degree of interest included in the spot information item is "Low", a notifying spot determination unit 2302 searches for the spot location using the spot search range table 2402 and using a circle having a radius of 100 m around the current location as the spot search range. When the spot search range is set to the middle distance in S63 and the degree of interest included in the spot information item is "Middle", the notifying spot determination unit 2302 searches for the spot location using the spot search range table 2402 and using a circle having a radius of 1 km around the current location as the spot search range. When the spot search range is set to the long distance in Step S63 and the degree of interest included in the spot information item is "High", the notifying spot determination unit 2302 searches for the spot location using the spot search range table 2402 and using a circle having a radius of 10 km around the current location as the spot search range.

Next, the notifying spot determination unit 2302 determines whether or not the spot location included in the N-th spot information item is within the acquired spot search range (Step S68).

For example, when the degree of interest is high, the spot notification unit 107 may also notify the user of the spot information item using vibration, a sound/voice, and light emission multiple times. When the degree of interest is low, the spot notification unit 107 may also notify the user of the spot information item using vibration only once. Thus, the spot notification unit 107 may also change the device for notifying the spot information item in accordance with the degree of interest or change the number of times the spot information item is notified in accordance with the degree of interest.

In Embodiment 3, the history of the operation performed by the user during viewing is used as the viewing situation. However, the viewing situation is not limited to the operation history.

For example, the television 202 may also include a camera for photographing the user, a sight-line-direction detection unit which detects the direction of the sight line of the user photographed by the camera, and a time measurement unit which measures the time during which the direction of the sight line detected by the sight-line-direction detection unit extends toward the television 202. The notifying spot determination unit 2302 may also determine how long and which section of the program the user viewed and use the viewing time as the viewing situation.

For example, the television 202 or a mobile terminal (a spot notification device) may also include a microphone which picks up the voice uttered by the user, and a voice recognition unit which recognizes the voice picked up by the microphone. The notifying spot determination unit 2302 may also determine, from the roughing voice of the user recognized by the voice recognition unit or the content of the conversation of the user, which section of the program and how long the user viewed with interest and use the time during which the user viewed the section with interest as the viewing situation.

For example, the spot notification system may also include a blood pressure meter, a thermometer, an electrocardiograph, or an electroencephalograph to be worn by the user. The notifying spot determination unit 2302 determines which section of the program and how long the user viewed with interest from the blood pressure, body temperature, heart rate, or brain waves measured by the blood pressure meter, the thermometer, the electrocardiograph, or the electroencephalograph and use the time during which the user viewed the section with interest as the viewing situation.

Here, the flow up to the generation of the spot list will be described using real data.

The program metadata server 201 holds program metadata 2000 shown in FIG. 23. On the other hand, the television 202 or the hard disk recorder 203 holds a program viewing history 2100 shown in FIG. 24.

The spot list generation unit 2301 acquires the program viewing history 2100 from the viewing history acquisition unit 102. The program viewing history 2100 may be acquired in advance by the viewing history acquisition unit 102 or may be acquired by the viewing history acquisition unit 102 with the timing when the spot list generation unit 2301 generates the spot list.

The spot list generation unit 2301 acquires the program metadata related to the program listed in the program viewing history 2100 from the program metadata acquisition unit 101. The program metadata acquisition unit 101 may also preliminarily acquire the program metadata related to all the programs from the program metadata server 201 and output only the program metadata related to the program listed in the program viewing history 2100 to the spot list generation unit 2301. The program metadata acquisition unit 101 may also acquire only the metadata related to the program listed in the program viewing history 2100 at the timing when a request to acquire the program metadata related to the program listed in the program viewing history 2100 is received from the spot list generation unit 2301 and output the program metadata to the spot list generation unit 2301.

The spot list generation unit 2301 acquires a program metadata 2001 corresponding to the first program in the program viewing history 2100. The program metadata 2001 is program metadata corresponding to the program having the program title "Gourmet Visit to Traditional Area" and the broadcast date/time "2013 Mar. 9 08:00-10:00".

Then, the spot list generation unit 2301 acquires a spot broadcast time ("08:00-08:15") for the first spot ("YYY Cafe") in the program metadata 2001 and acquires the viewing situation during the acquired spot broadcast time from the program viewing history 2101. Since the viewing situation during the acquired spot broadcast time is "Normally Reproduced", the spot list generation unit 2301 sets the degree of interest to "Middle". Then, the spot list generation unit 2301 enters "Program Title" in the program metadata 2001 in "Program Title" in the spot list, enters "Broadcast Date/Time" in the program metadata 2001 in "Broadcast Date/Time" in the spot list, enters "Spot Name" in the program metadata 2001 in "Spot Name" in the spot list, enters "Spot Location" in the program metadata 2001 in "Spot Location" in the spot list, enters "Spot URL" in the program metadata 2001 in "Spot URL" in the spot list, and enters "Middle" in "Degree of interest" in the spot list.

Next, the spot list generation unit 2301 acquires a spot broadcast time ("08:15-08:20") for the second spot ("ZZZ Restaurant") in the program metadata 2001 and acquires the viewing situation, during the acquired spot broadcast time from the program viewing history 2101. Since the viewing situation during the acquired spot broadcast time is "Reproduced at Double Speed", the spot list generation unit 2301 sets the degree of interest to "Low". Then, the spot list generation unit 2301 enters "Program Title" in the program metadata 2001 in "Program Title" in the spot list, enters "Broadcast Date/Time" in the program metadata 2001 in "Broadcast Date/Time" in the spot list, enters "Spot Name" in the program metadata 2001 in "Spot Name" in the spot list, enters "Spot Location" in the program metadata 2001 in "Spot Location" in the spot list, enters "Spot URL" in the program metadata 2001 in "Spot URL" in the spot list, and enters "Low" in "Degree of interest" in the spot list.

Next, the spot list generation unit 2301 acquires a spot broadcast time ("08:20-08:25") for the third spot ("XXX Boutique") in the program metadata 2001 and acquires the viewing situation during the acquired spot broadcast time from the program viewing history 2101. Since the viewing situation during the acquired spot broadcast time is "Unviewed", the spot list generation unit 2301 does not add the spot to the spot list.

The spot list generation unit 2301 performs the same operation on all the programs in the program viewing history 2101 to complete the spot list 2200.

When the notifying spot determination unit 2302 acquires the spot list and the activity history to search for the spot to be notified the user, if the spot search range is set to "Short Distance" and the degree of interest in "YYY Cafe" in the spot list 2200 is "Middle", the notifying spot determination unit 2302 refers to the spot search range table 2402, extracts the radial distance "500 m" associated with "Short Distance" as the spot search range and "Middle" as the degree of interest, and determines whether or not the spot location of "YYY Cafe" is included in a circle having a radius of 500 m around the current location. Thus, the notifying spot determination unit 2302 determines whether or not the spot "YYY Cafe" is to be notified.

If the spot search range is set to "Short Distance" and the degree of interest in "ZZZ Restaurant" in the soot list 2200 is "Low", the notifying spot determination unit 2302 refers to the spot search range table 2402, extracts the radial distance "100 m" associated with "Short Distance" as the spot search range and "Low" as the degree of interest, and determines whether or not the spot location of "ZZZ Restaurant" is included in a circle having a radius of 100 m around the current location. Thus, the notifying spot determination unit 2302 determines whether or not the spot "ZZZ Restaurant" is to be notified. In this manner, in accordance with the situation in which the user viewed the program, the spot search range can be changed.

Note that, in Embodiments 1 to 3, the television 202 or the hard disk recorder 203 may also specify the users who viewed programs and store the program viewing history for each of the specified users. The viewing history acquisition unit 102 may also specify the user who uses the spot notification device and acquire the program viewing history corresponding to the specified user. The spot list generation units 103 and 2301 may also generate a spot list corresponding to the specified user. In this manner, when, e.g., a plurality of users view programs on one television, the spot introduced in the program viewed by each of the plurality of users can be notified.

Note that, in each of the specific embodiments described above, the invention having the foregoing configuration is mainly included.

A spot notification method according to an aspect of the present invention is a spot notification method of notifying a spot introduced in a program viewed to by a user and includes: a viewing history acquisition step of acquiring a program viewing history of the user; a program data acquisition step of acquiring program data including a name and locational information on the spot introduced in the program; a generation step of generating, on the basis of the acquired viewing history and the acquired program data, a spot list including the name and locational information on the spot introduced in the program viewed to by the user, a location acquisition step of acquiring a current location of the user; an activity history holding step of holding the acquired current location in time series as an activity history; a search range setting step of setting a search range in accordance with the activity history; a search step of referring to the spot list and searching for the spot present within the set search range; and a notification step of notifying the user of information related to the spot that has been searched for.

In this configuration, the program viewing history of the user is acquired. The program data including the name and locational information on the spot introduced in the program is acquired. On the basis of the acquired viewing history and the acquired program data, the spot list including the name and locational information on the spot introduced in the program viewed to by the user is generated. The current location of the user is acquired. The acquired current location is held in time series as the activity history. The search range is set in accordance with the activity history. The spot list is referred to and the spot present within the set search range is searched for. The information related the spot retrieved by the search is notified the user.

Thus, the search range is set in accordance with the activity history showing the current location of the user in time series and the information related to the spot present within the set search range is notified the user. Therefore, it is possible to reliably notify the user of the spot introduced in the program viewed to by the user with proper timing.

Preferably, in the spot notification method described above, the search range includes a first search range having a first radial distance, a second search range having a second radial distance longer than the first radial distance, and a third search range having a third radial distance longer than the second radial distance, and the search range determination step determines whether or not the acquired current location is included in the activity history over a predetermined period, sets the search range to the first search range when determining that the acquired current location is included in the activity history over the predetermined period, determines whether or not the acquired current location is included in the activity history over a period preceding the predetermined period when determining that the acquired current location is not included in the activity history over the predetermined period, sets the search range to the second search range when determining that the acquired current location is included in the activity history over the period preceding the predetermined period, and sets the search range to the third search range when determining that the acquired current location is not included in the activity history over the period preceding the predetermined period.

In this configuration, the search range includes the first search range having the first radial distance, the second search range having the second radial distance longer than the first radial distance, and the third search range having the third radial distance longer than the second radial distance. It is determined whether or not the acquired current location is included in the activity history over the predetermined period. When it is determined that the acquired current location is included in the activity history over the predetermined period, the search range is set to the first search range. When it is determined that the acquired current location is not included in the activity history over the predetermined period, it is determined whether or not the acquired current location is included in the activity history over the period preceding the predetermined period. When it is determined that the acquired current location is included in the activity history over the period preceding the predetermined period, the search range is set to the second search range. When it is determined that the acquired current location is not included in the activity history over the period preceding the predetermined period, the search range is set to the third search range.

Accordingly, depending on whether or not the current location is within the range of daily activities of the user and on whether or not the user has visited the current location before, the size of the search range changes. Therefore, it is possible to notify the user of the information related to the spot in accordance with the activity history of the user.

Preferably, in the spot notification method described above, in the search step a notification determination table, in which a type of the spot is associated with a notification condition for determining whether or not the spot is to be notified, is referred to in order to search for a spot which satisfies the notification condition associated with the type of the spot.

In this configuration, the notification determination table in which the type of the spot is associated with the notification condition for determining whether or not the spot is to be notified is referred to, and a spot which satisfies the notification condition associated with the type of the spot is searched for. Thus, the notification condition is individually set for each spot type, and therefore it is possible to determine whether or not the information related to the spot is to be notified in accordance with the type of the spot.

Preferably, in the spot notification method described above, the notification condition includes that the current time is within opening hours of the spot or the current time is within hours set in advance for the spot.

This configuration can prevent the user from visiting the spot out of the opening hours of the spot. The configuration can also prompt the user to visit the spot during optimum hours set in advance for the spot.

Preferably, the spot notification method described above further includes a moving speed acquisition step of acquiring a moving speed of the user and the notification condition includes a condition under which the moving speed of the user is not more than a walking speed.

In the configuration, when the moving speed of the user is not more than the walking speed, the information related to the spot is notified. Therefore, it is possible to notify the user of the information related, to the spot with timing which is convenient for the user to view the information such as, e.g., when the user stops walking.

Preferably, the spot notification method described above further includes an activity amount acquisition step of acquiring an amount of activity of the user and the search step determines timing of notifying the spot in accordance with the acquired amount of activity of the user.

In this configuration, the timing of notifying the spot is determined in accordance with the amount of activity of the user. Therefore, it is possible to notify the user of the information related to the spot with timing which is convenient for the user to view the information such as, e.g., when the user stops walking or the user is moving on a train.

Preferably, in the spot notification method described above, the viewing history includes a viewing situation showing how the use viewed to the program, and the search range determination step sets the search range in accordance with the viewing situation.

In this configuration, the search range is determined in accordance with the viewing situation showing how the user viewed to the program. Therefore it is possible to notify the user of the spot in which the user has interest and not to notify the user of the spot in which the user does not have interest.

Preferably, in the spot notification method described above, the viewing situation includes a first viewing situation in which the program recorded on a recording device is reproduced in fast-forward, a second viewing situation in which the program recorded on the recording device is reproduced at a normal speed, and a third viewing situation in which the program recorded on the recording device is reproduced at the normal speed multiple times, the search range includes the first search range having the first radial distance, the second search range having the second radial distance longer than the first radial distance, and the third search range having the third radial distance longer than the second radial distance, and in the search range setting step, the search range is set to the first search range when the program recorded on the recording device is viewed to in the first viewing situation, the search range is set to the second search range when the program recorded on the recording device is viewed to in the second viewing situation, and the search range is set to the third search range when the program recorded on the recording device is viewed to in the third viewing situation.

In this configuration, the viewing situation includes the first viewing situation in which the program recorded on the recording device was reproduced in fast-forward, the second viewing situation in which the program recorded on the recording device was reproduced at the normal speed, and the third viewing situation in which the program recorded on the recording device was reproduced at the normal speed multiple times. The search range includes the first search range having the first radial distance, the second search range having the second radial distance longer than the first radial distance, and the third search range having the third radial distance longer than the second radial distance. When the program recorded on the recording device was viewed to in the first viewing situation, the search range is set to the first search range. When the program recorded on the recording device was viewed to in the second viewing situation, the search range is set to the second search range. When the program recorded on the recording device was viewed to in the third viewing situation, the search range is set to the third search range.

Accordingly, the size of the search range can be changed in accordance with the operation performed by the user on the program recorded on the recording device. It is possible to notify the user of the spot in which the user has interest and not to notify the user of the spot in which the user does not have interest.

A spot notification device according to another aspect of the present invention is a spot notification device of notifying a spot introduced in a program viewed to by a user and includes: a viewing history acquisition unit that acquires a program viewing history of the user; a program data acquisition unit that acquires program data including a name and locational information on the spot introduced in the program; a generation unit that generates, on the basis of the acquired viewing history and the acquired program data, a spot list including the name and locational information on the spot introduced in the program viewed to by the user; a location acquisition unit that acquires a current location of the user; an activity history holding unit that holds the acquired current location in time series as an activity history; a search range setting unit that sets a search range in accordance with the activity history; a search unit that refers to the spot list and searches for the spot present within the set search range; and a notification unit that notifies the user of information related to the spot that has been searched for.

In this configuration, the program viewing history of the user is acquired. The program data including the name and locational information on the spot introduced in the program is acquired. On the basis of the acquired viewing history and the acquired program data, the spot list including the name and locational information on the spot introduced in the program, viewed to by the user is generated. The current location of the user is acquired. The acquired current location is held in time series as the activity history. The search range is set in accordance with the activity history. The spot list is referred to and the spot present within the set search range is searched for. The information related the spot retrieved by the search is notified the user.

Thus, the search range is set in accordance with the activity history showing the current location of the user in time series and the information related to the spot present within the set search range is notified the user. Therefore, it is possible to reliably notify the user of the spot introduced in the program viewed by the user with proper timing.

A spot notification program according to still another aspect of the present invention is a spot notification program of notifying a spot introduced in a program viewed to by a user and causes a computer to function as: a viewing history acquisition unit that acquires a program viewing history of the user; a program data acquisition unit that acquires program data including a name and locational information on the spot introduced in the program; a generation unit that generates, on the basis of the acquired viewing history and the acquired program data, a spot list including the name and locational information on the spot introduced in the program viewed to by the user; a location acquisition unit that acquires a current location, of the user; an activity history holding unit that holds the acquired current location in time series as an activity history; a search range setting unit that sets a search range in accordance with the activity history; a search unit that refers to the spot list and searches for the spot present within the set search range; and a notification unit that notifies the user of information related to the spot that has been searched for.

In this configuration, the program viewing history of the user is acquired. The program data including the name and locational information on the spot introduced in the program is acquired. On the basis of the acquired viewing history and the acquired program data, the spot list including the name and locational information on the spot introduced in the program viewed to by the user is generated. The current location of the user is acquired. The acquired current location is held in time series as the activity history. The search range is set in accordance with the activity history. The spot list is referred to and the spot present within the set search range is searched for. The information related the spot retrieved by the search is notified the user.

Thus, the search range is set in accordance with the activity history showing the current location of the user in time series and the information related to the spot present within the set search range is notified the user. Therefore, it is possible to reliably notify the user of the spot introduced in the program viewed by the user with proper timing.

Each of the specific embodiments and examples made in the section of Description of Embodiments is intended merely to clarify the technical content of the present invention. The present invention is not to be construed as limited to these specific examples, but to be construed in a broad sense, and may be practiced with various modifications within the spirit and the scope of the claims.

INDUSTRIAL APPLICABILITY

A spot notification method, a spot notification device, and a spot notification program each according to the present invention can reliably notify the user of the spot introduced in the program viewed to by a user with proper timing and are useful as a spot notification method, a spot notification device, and a spot notification program each of which notifies the user of the spot introduced in the program viewed to by a user.

The invention claimed is:

1. A spot notification method for use with a device including a Global Positioning System (GPS) receiver, the method being for notifying a spot introduced in a program viewed by a user, the method comprising:
 a viewing history acquisition step of acquiring a program viewing history of the user;
 a program data acquisition step of acquiring program data including a name and locational information on the spot introduced in the program;
 a generation step of generating, on the basis of the acquired viewing history and the acquired program data, a spot list including the name and locational information on the spot introduced in the program viewed to by the user;
 a location acquisition step of acquiring, using the GPS receiver, a current location of the user;
 an activity history holding step of holding the acquired current location in time series as an activity history;
 a search range setting step of setting a search range in accordance with the activity history;
 a search step of referring to the spot list and searching for the spot present within the set search range; and
 a notification step of notifying the user of information related to the spot that has been searched for, wherein
 the search range includes a first search range having a first radial distance, a second search range having a second radial distance longer than the first radial distance, and a third search range having a third radial distance longer than the second radial distance, and
 the search range determination step determines whether or not the acquired current location is included in the activity history over a predetermined period, sets the search range to the first search range when determining that the acquired current location is included in the activity history over the predetermined period, determines whether or not the acquired current location is included in the activity history over a period preceding the predetermined period when determining that the acquired current location is not included in the activity history over the predetermined period, sets the search range to the second search range when determining that the acquired current location is included in the activity history over the period preceding the predetermined period, and sets the search range to the third search range when determining that the acquired current location is not included in the activity history over the period preceding the predetermined period.

2. The spot notification method according to claim 1, wherein in the search step, a notification determination table, in which a type of the spot is associated with a notification condition for determining whether or not the spot is to be notified, is refers to in order search for a spot which satisfies the notification condition associated with the type of the spot.

3. The spot notification method according to claim 2, wherein the notification condition includes that the current time is within opening hours of the spot or the current time is within hours set in advance for the spot.

4. The spot notification method according to claim 2, further comprising:
a moving speed acquisition step of acquiring a moving speed of the user, wherein
the notification condition includes a condition under which the acquired moving speed of the user is not more than a walking speed.

5. The spot notification method according to claim 1, further comprising:
an activity amount acquisition step of acquiring an amount of activity of the user, wherein
the search step determines timing of notifying the spot in accordance with the acquired amount of activity of the user.

6. The spot notification method according to claim 1, wherein
the viewing history includes a viewing situation showing how the user viewed to the program, and
the search range determination step sets the search range in accordance with the viewing situation.

7. The spot notification method according to claim 6, wherein
the viewing situation includes a first viewing situation in which the program recorded on a recording device is reproduced in fast-forward, a second viewing situation in which the program recorded on the recording device is reproduced at a normal speed, and a third viewing situation in which the program recorded on the recording device is reproduced at the normal speed multiple times,
the search range includes the first search range having the first radial distance, the second search range having the second radial distance longer than the first radial distance, and the third search range having the third radial distance longer than the second radial distance, and
in the search range setting step, the search range is set to the first search range when the program recorded on the recording device is viewed to in the first viewing situation, the search range is set to the second search range when the program recorded on the recording device is viewed to in the second viewing situation, and the search range is set to the third search range when the program recorded on the recording device is viewed to in the third viewing situation.

8. A spot notification device for use with a device including a Global Positioning System (GPS) receiver, the spot notification device being for notifying a spot introduced in a program viewed by a user, the spot notification device comprising:
a viewing history acquisition unit that acquires a program viewing history of the user;
a program data acquisition unit that acquires program data including a name and locational information on the spot introduced in the program;
a generation unit that generates, on the basis of the acquired viewing history and the acquired program data, a spot list including the name and locational information on the spot introduced in the program viewed to by the user;
a location acquisition unit that acquires, using the GPS receiver, a current location of the user;
an activity history holding unit that holds the acquired current location in time series as an activity history;
a search range setting unit that sets a search range in accordance with the activity history;
a search unit that refers to the spot list and searches for the spot present within the set search range; and
a notification unit that notifies the user of information relating to the spot that has been searched for, wherein
the search range includes a first search range having a first radial distance, a second search range having a second radial distance longer than the first radial distance, and a third search range having a third radial distance longer than the second radial distance, and
the search range setting unit determines whether or not the acquired current location is included in the activity history over a predetermined period, sets the search range to the first search range when determining that the acquired current location is included in the activity history over the predetermined period, determines whether or not the acquired current location is included in the activity history over a period preceding the predetermined period when determining that the acquired current location is not included in the activity history over the predetermined period, sets the search range to the second search range when determining that the acquired current location is included in the activity history over the period preceding the predetermined period, and sets the search range to the third search range when determining that the acquired current location is not included in the activity history over the period preceding the predetermined period.

9. A non-transitory computer readable recording medium storing for a spot notification program for use with a device including a Global Positioning System (GPS) receiver, the spot notification program being for notifying a spot introduced in a program viewed by a user, the spot notification program causing a computer to function as:
a viewing history acquisition unit that acquires a program viewing history of the user;
a program data acquisition unit that acquires program data including a name and locational information on the spot introduced in the program;
a generation unit that generates, on the basis of the acquired viewing history and the acquired program data, a spot list including the name and locational information on the spot introduced in the program viewed to by the user;
a location acquisition unit that acquires, using the GPS receiver, a current location of the user;
an activity history holding unit that holds the acquired current location in time series as an activity history;
a search range setting unit that sets a search range in accordance with the activity history;
a search unit that refers to the spot list and searches for the spot present within the set search range; and
a notification unit that notifies the user of information related to the spot that has been searched for, wherein
the search range includes a first search range having a first radial distance, a second search range having a second radial distance longer than the first radial distance, and a third search range having a third radial distance longer than the second radial distance, and the search range setting unit determines whether or not the acquired current location is included in the activity history over a predetermined period, sets the search range to the first search range when determining that the acquired current location is included in the activity history over the predetermined period, determines whether or not the acquired current location is included in the activity history over a period preceding the predetermined period when determining that the acquired current location is not included in the activity history over the predetermined period, sets the search range to the second search range when determining that the acquired current location is included in the activity history over the period preceding the predetermined period, and sets the search range to the third search range when determining that the acquired current location is not included in the activity history over the period preceding the predetermined period.

\* \* \* \* \*